United States Patent
Otsuka et al.

(10) Patent No.: US 7,503,304 B2
(45) Date of Patent: Mar. 17, 2009

(54) INTERNAL ENGINE PISTON AND ITS PRODUCTION METHOD

(75) Inventors: Koki Otsuka, Tochigi-ken (JP); Seiichi Endo, Tochigi-ken (JP); Takashi Hattori, Niigata-ken (JP); Masanori Hara, Tochigi-ken (JP); Susumu Katsuragi, Fukuoka-ken (JP)

(73) Assignees: Hitachi Metals, Ltd., Tokyo (JP); Hino Motors Ltd., Tokyo (JP)

( * ) Notice: Subject to any disclaimer, the term of this patent is extended or adjusted under 35 U.S.C. 154(b) by 0 days.

(21) Appl. No.: 10/551,645

(22) PCT Filed: Mar. 31, 2004

(86) PCT No.: PCT/JP2004/004629

§ 371 (c)(1),
(2), (4) Date: Sep. 29, 2005

(87) PCT Pub. No.: WO2004/094808

PCT Pub. Date: Nov. 4, 2004

(65) Prior Publication Data

US 2006/0191508 A1     Aug. 31, 2006

(30) Foreign Application Priority Data

Mar. 31, 2003    (JP)    ............... 2003-097015

(51) Int. Cl.
*F02F 3/00*    (2006.01)
(52) U.S. Cl. ................... 123/193.6; 29/888.04
(58) Field of Classification Search ............. 123/193.6, 123/193.4, 41.34, 41.35; 29/888.04
See application file for complete search history.

(56) References Cited

U.S. PATENT DOCUMENTS

| | | | | |
|---|---|---|---|---|
| 3,876,475 | A | * | 4/1975 | Ramqvist ................. 420/38 |
| 3,943,908 | A | * | 3/1976 | Kubis et al. ............ 123/193.6 |
| 4,966,751 | A | * | 10/1990 | Kaede et al. ............ 420/34 |
| 4,985,092 | A | * | 1/1991 | Kaede et al. ............ 148/326 |
| 5,023,049 | A | * | 6/1991 | Norstrom et al. .......... 420/91 |
| 5,136,992 | A | * | 8/1992 | Bregler et al. .......... 123/193.6 |
| 5,322,042 | A | * | 6/1994 | di Priolo et al. ............ 123/263 |
| 6,527,879 | B2 | * | 3/2003 | Kubota et al. ............ 148/333 |
| 6,622,613 | B1 | * | 9/2003 | Kortas et al. ............ 92/223 |
| 6,789,460 | B2 | * | 9/2004 | Kohnert ................. 92/186 |
| 6,840,155 | B2 | * | 1/2005 | Ribeiro et al. ............ 92/186 |
| 2004/0040631 | A1 | * | 3/2004 | Takahashi et al. .......... 148/226 |

(Continued)

FOREIGN PATENT DOCUMENTS

DE    10 2006 053 179 A1  *  5/2007

(Continued)

*Primary Examiner*—Hai H Huynh
(74) *Attorney, Agent, or Firm*—Sughrue Mion, PLLC

(57) ABSTRACT

An integrally cast steel piston for internal engines, the cast steel having (a) a composition comprising 0.8% or less of C, 3% or less of Si, 3% or less of Mn, 0.2% or less of S, 3% or less of Ni, 6% or less of Cr, 6% or less of Cu, and 0.01-3% of Nb, the balance being substantially Fe and inevitable impurities, or (b) a composition comprising 0.1-0.8% of C, 3% or less of Si, 3% or less of Mn, 0.2% or less of S, 10% or less of Ni, 30% or less of Cr, 6 % or less of Cu, and 0.05-8% of Nb, the balance being substantially Fe and inevitable impurities, by mass.

22 Claims, 6 Drawing Sheets

U.S. PATENT DOCUMENTS

| | | | |
|---|---|---|---|
| 2005/0076975 A1 * | 4/2005 | Lopez et al. | 148/593 |
| 2005/0172926 A1 * | 8/2005 | Poola et al. | 123/193.6 |
| 2006/0037471 A1 * | 2/2006 | Zhu et al. | 92/173 |
| 2006/0086326 A1 * | 4/2006 | Rasmussen | 123/41.35 |
| 2006/0169368 A1 * | 8/2006 | Lopez et al. | 148/332 |
| 2006/0191508 A1 * | 8/2006 | Otsuka et al. | 123/193.6 |
| 2006/0226138 A1 * | 10/2006 | James et al. | 219/145.22 |
| 2006/0275168 A1 * | 12/2006 | Rakowski et al. | 420/46 |
| 2006/0285989 A1 * | 12/2006 | Schade | 419/11 |
| 2007/0187002 A1 * | 8/2007 | Takahashi et al. | 148/318 |

FOREIGN PATENT DOCUMENTS

| | | | |
|---|---|---|---|
| JP | 1-119646 | * | 5/1989 |
| JP | 4-63046 | * | 9/1992 |
| JP | 11-216537 | * | 8/1999 |

\* cited by examiner

INTERNAL ENGINE PISTON AND ITS PRODUCTION METHOD

FIELD OF THE INVENTION

The present invention relates to an internal engine piston suitable for automobile engines, particularly for diesel engines, etc., and its production method.

BACKGROUND OF THE INVENTION

The combustion temperatures and pressures of automobile engines have been becoming increasingly higher to achieve higher power and lower fuel consumption. Accordingly, demand is increasingly mounting particularly in diesel engine pistons for higher heat resistance such as high-temperature yield strength, high-temperature rigidity, thermal cracking resistance, etc., and for lighter weight to achieve higher power and lower fuel consumption. Also, in order that there are no abnormal wear, scuffing, seizure, etc. in sliding portions, for instance, between a skirt portion of a piston and a cylinder liner, between a pin boss portion of a piston and a piston pin, between piston ring grooves and piston rings, etc., improvement is required on such properties as wear resistance, seizure resistance, low thermal expansion, etc. Particularly when the seizure resistance, which may be called "scuffing resistance" or "scoring resistance," is low, a piston and/or a mating member are scratched, resulting in accelerated wear, and sometimes scuffing or seizure. Therefore, the seizure resistance is an extremely important property for the piston.

Aluminum alloys such as JIS AC8A, etc. have conventionally been used for diesel engine pistons for weight reduction. However, because aluminum alloy pistons have as low thermal and mechanical durability temperatures as about 350° C., and large thermal expansion, they suffer a problem that seizure and scuffing are likely to occur. Accordingly, spheroidal graphite cast iron having relatively high durability up to about 400° C., and good seizure resistance due to the self-lubrication of graphite in the microstructure has recently become adopted in place of aluminum alloys (see, for instance, JP 10-85924 A).

Despite sufficient ductility, however, pistons made of spheroidal graphite cast iron have insufficient heat resistance when their temperatures become 450° C. or higher, causing the problem that thermal cracking occurs in lips, etc. by repeated application of thermal and mechanical loads. Though the spheroidal graphite cast iron exhibits relatively good seizure resistance due to the self-lubrication of graphite up to a combustion pressure of about 15 MPa, its seizure resistance due to graphite lubrication becomes unsatisfactory, and its high-temperature yield strength and high-temperature rigidity decrease, when the combustion pressure is elevated to 20 MPa or more. As a result, a piston and a mating member (cylinder liner, etc.) are worn by their strong contact, resulting in large blowby. In addition, troubles such as scuffing, seizure and breakage occur due to uneven contact, etc., making it likely that the engine performance is deteriorated.

When the piston of spheroidal graphite cast iron is made thinner for weight reduction, its high-temperature rigidity becomes too low, so that cracking is likely to occur in a pin boss portion, a skirt portion, etc. in addition to the lip. Thus, the piston of spheroidal graphite cast iron cannot be made drastically light in weight.

To cope with the increased combustion temperature and pressure, U.S. Pat. No. 5,136,992 proposes a piston comprising a head portion having a pin boss portion, and a skirt portion, which are produced separately and integrally assembled. FIG. 9 is a cross-sectional view showing an example of such piston 100. The piston 100 comprises a head portion 101 comprising a combustion chamber 105, a top surface 106 and an opening fringe (lip) 107 of the combustion chamber 105, a skirt portion 102, a top land 108, ring grooves 109 for receiving piston rings, a pin boss portion 104, and a cooling hollow portion 103 called cooling channel or gallery, in which oil is circulated to cool the combustion chamber 105. 100$h$ denotes a distance (compression height) from a center of a hole for receiving the pin to the top surface 106.

The head portion 101 and the pin boss portion 104, which need high heat resistance, are formed by a precipitation-hardened, forged ferrite-pearlite steel comprising, by weight, 0.32-0.45% of C, 0.4-0.9% of Si, 1.0-1.8% of Mn, 0.035% or less of P, 0.065% or less of S, and 0.06-0.15% of V, the balance being Fe, and the skirt portion 102 is formed by a light alloy such as aluminum, etc. It is described that such microstructure makes it possible to produce a piston at a lower cost than a conventional $Fe_{bal}Cr_{42}Mo_4$ alloy (corresponding to JIS SCM440).

Though the forged steel piston 100 has excellent high-temperature rigidity, it is likely to have insufficient seizure resistance and wear resistance at a combustion pressure elevated to 20-25 MPa, because of no self-lubricating graphite in the microstructure. Also, because it is produced by a forging method, sulfides and non-metallic inclusions are extended thin and long in a main deformation direction (along a metal flow line) during forging, so that thermal cracking is likely to occur in the lip 107 of the combustion chamber 105, etc. under a high thermal and mechanical load.

In addition, it needs the step of assembling the head portion 101 and the skirt portion 102, resulting in a high production cost. Further, because it needs a space, into which a bite for machining the cooling hollow portion 103 is introduced, it inevitably has a large compression height 100$h$, resulting in difficulty in size reduction. Further, because the piston comprising the cooling hollow portion 103 cannot be produced integrally by one step in the forging method, the step of machining the cooling hollow portion 103, the step of fixing a cover f to the hollow portion 103, etc. are necessary, resulting in increased production cost.

Japanese Patent 2,981,899 proposes a piston ring subjected to nitriding to improve wear resistance and seizure resistance, which comprises, by weight, 0.6-1.1% of C, 2.0% or less of Si, 2% or less of Mn, 10.0-18.0% of Cr, 0.5-4.0% of Mo and/or W (Mo+½ W), 0.05-2.0% of V and/or Nb (V+½ Nb), 2.5% or less of Ni, 12% or less of Co, 0.5% or more of Ni+Co, 0.015% or less of P, 0.005% or less of S, and 30 ppm or less of O, the balance being Fe and inevitable impurities, thereby having excellent corrosion wear properties and fatigue properties in a sulfuric acid atmosphere. It is described that V and Nb make crystal grains finer to improve toughness, form carbides to improve wear resistance and seizure resistance, and improve temper-softening resistance.

However, the piston ring, which is constituted by a narrow plate worked to a ring shape, can be easily produced even from steel containing a large amount of Cr carbides. However, when integral castings having complicated shapes and thus needing many machining steps, such as a piston, are produced, their production yield is low because of difficult casting and machining, needing a high cost, many steps, etc. It is thus extremely difficult to integrally cast a piston from the above piston ring material. Further, because the above piston ring material does not have heat resistance such as high-temperature yield strength, high-temperature rigidity and thermal cracking resistance, seizure resistance, etc. to levels needed for the piston, it cannot be used for an integrally cast piston.

It is expected that the piston temperature is elevated to about 450-500C, and the combustion pressure increases to about 20-25 MPa particularly in a diesel engine piston, as the combustion temperature is elevated. Accordingly, the piston should be resistant to such high temperature and pressure. In addition, the piston should have high seizure resistance, in order that scuffing, seizure, etc. do not occur by contact with a mating member such as a cylinder liner, a piston pin, piston rings, etc. during sliding under high thermal and mechanical load conditions. For higher power and lower fuel consumption of an engine, there are demands to reduce inertia during the reciprocal movement of a piston, to reduce the weight of a piston, to reduce the friction of a piston, to reduce engine noise, to downsize an engine, etc. It is thus desired to make the piston thinner, reduce the compression height, etc.

Integral casting to a near-net shape makes the assembling and connection of components unnecessary, and reduces the working cost. Accordingly, the integrally cast piston advantageously enjoys an extremely lower production cost than the assembled, forged piston of U.S. Pat. No. 5,136,992, which requires the machining of a cooling hollow portion, the fixing of a cover to the hollow portion, and the assembling of a head portion to a skirt portion. In addition, because the integrally cast piston does not need a space for machining the cooling hollow portion, it can have a low compression height, so that it can be made lighter and smaller. The integral casting of a head portion with a pin boss portion and a skirt portion can produce a gasoline engine piston needing no cooling hollow portion. Further, integral casting including a cooling hollow portion can produce a piston suitable for diesel engines. It is particularly suitable for a direct injection diesel engine piston comprising a combustion chamber in a head portion, and a cooling hollow portion near the combustion chamber.

In addition, the piston is required to have high strength and ductility, in order that no cracking and breakage occur by vibration and impact even when used under a high thermal and mechanical load. Particularly to avoid the generation of cracking and breakage, ductility is required not only in use in an engine, but also in a production step, an assembling step, etc. A low-temperature ductility generally at room temperature or lower is represented by a room-temperature elongation.

OBJECTS OF THE INVENTION

Accordingly, an object of the present invention is to provide an internal engine piston having good room-temperature elongation, and high high-temperature yield strength, high-temperature rigidity and thermal cracking resistance such that it can be used even at a piston temperature of 450° C. or higher and a combustion pressure of 20 MPa or more, as well as excellent seizure resistance, which is suitable for automobile engines, particularly for diesel engines, etc.

Another object of the present invention is to provide a method for producing such an internal engine piston.

DISCLOSURE OF THE INVENTION

As a result of intense research in view of the above objects, it has been found that an integrally cast steel piston having heat resistance, corrosion resistance and wear resistance exhibits sufficient high-temperature yield strength, high-temperature rigidity, thermal cracking resistance and seizure resistance even under severe conditions of a piston temperature of 450° C. or higher and a combustion pressure of 20 MPa or more, so that it can be made lighter in weight. The present invention has been completed based on this finding.

The internal engine piston of the present invention is integrally cast. Namely, the internal engine piston of the present invention comprises integrally cast head portion, pin boss portion and skirt portion. The integrally cast internal engine piston preferably has a cooling hollow portion. This internal engine piston is suitable for diesel engines, and it preferably has a combustion chamber in a head portion, and a cooling hollow portion near the combustion chamber.

The first cast steel forming the internal engine piston of the present invention preferably has a composition comprising, by mass, 0.8% or less of C, 3% or less of Si, 3% or less of Mn, 0.2% or less of S, 3% or less of Ni, 6% or less of Cr, 6% or less of Cu, and 0.01-3% of Nb, the balance being substantially Fe and inevitable impurities. The more preferred composition comprises, by mass, 0.1-0.55% of C, 0.2-2% of Si, 0.3-3% of Mn, more than 0.005% and 0.2% or less of S, 1% or less of Ni, 3% or less of Cr, 1-4% of Cu, and 0.1-3% of Nb, the balance being substantially Fe and inevitable impurities.

The second cast steel forming the internal engine piston of the present invention preferably has a composition comprising, by mass, 0. 1-0.8% of C, 3% or less of Si, 3% or less of Mn, 0.2% or less of S, 10% or less of Ni, 30% or less of Cr, 6% or less of Cu, and 0.05-8% of Nb, the balance being substantially Fe and inevitable impurities. The more preferred composition comprises, by mass, 0.1-0.55% of C, 0.2-2% of Si, 0.3-3% of Mn, 0.05-0.2% of S, 0.5-6% of Ni, 6-20% of Cr, 1-4% of Cu, and 0.2-5% of Nb, the balance being substantially Fe and inevitable impurities. The amounts of C, Ni and Nb preferably meet the requirement of $0.05 < (C\% + 0.15 Ni\% - 0.12 Nb\%) < 0.8$ by mass. In the matrix microstructure, an austenite phase is preferably less than 30% of the overall cast steel microstructure.

Any of the first and second cast steels for the internal engine piston of the present invention preferably further comprises 0.5% by mass or less of V and/or Ti. Any of the first and second cast steels preferably further comprises at least one of Al, Mg and Ca in an amount of 0.04% by mass or less.

The first cast steel is preferably subjected to a heat treatment comprising holding it at 850° C. or higher after casting, and then air-cooling it. The second cast steel is preferably subjected to a heat treatment comprising holding it at 450° C. or higher after casting, and then air-cooling it. The second cast steel is more preferably subjected to a heat treatment comprising holding it at 1000° C. or higher after casting, rapidly cooling it, holding it at 450C or higher, and then air-cooling it.

The cast steel is preferably (1) cast steel having a matrix microstructure comprising an α-ferrite phase and a pearlite phase (hereinafter referred to simply as "α-P cast steel"), and (2) cast steel having a matrix microstructure comprising a δ-ferrite phase and a martensite phase, with an austenite phase less than 30% (hereinafter referred to simply as "δ-M cast steel"). Particularly to withstand a severe thermal and mechanical load as a diesel engine piston, etc., it is preferable to use δ-M cast steel. The δ-M cast steel is specifically a cast steel based on a material having heat resistance, corrosion resistance and wear resistance, such as SCS24 (JIS), which is precipitation-hardened cast stainless steel, and SUS630 (JIS) (usually 17-4PH), which is precipitation-hardened stainless steel, the composition of the material being modified to have seizure resistance.

Integral casting to a near-net shape makes the assembling and connection of components unnecessary, and reduces the working cost. Accordingly, the integrally cast piston advantageously enjoys an extremely lower production cost than the assembled, forged piston of U.S. Pat. No. 5,136,992, which requires the machining of a cooling hollow portion, the fixing of a cover to the hollow portion, and the assembling of a head portion to a skirt portion. un addition, because the integrally cast piston does not need a space for machining the cooling hollow portion, it can have a low compression height, so that it can be made lighter and smaller. The integral casting of a head portion with a pin boss portion and a skirt portion can produce a gasoline engine piston needing no cooling hollow portion. Further, integral casting including a cooling hollow portion can produce a piston suitable for diesel engines. It is particularly suitable for a direct injection diesel engine piston comprising a combustion chamber in a head portion, and a cooling h6llow portion near the combustion chamber.

To have good high-temperature yield strength, high-temperature rigidity, thermal cracking resistance, room-temperature elongation, as well as seizure resistance, the microstructure of the cast steel has eutectic carbides at an area ratio of 1-35%. High-hardness eutectic carbides contained in the structure of a piston at an area ratio of 1-35% alleviate high-hardness phases contained in mating members, such as steadite contained in a cylinder liner, Cr carbides contained in piston rings, martensite formed on a piston pin surface by carburization hardening, etc. from attacking the piston. Also, the inclusion of a proper amount of eutectic carbides reduces an area ratio of a matrix phase (namely, matrix microstructure) having relatively high adhesion, thereby suppressing the adhesion of matrix phases between a piston and a mating member and thus improving seizure resistance. The above effects can be obtained when the area ratio of eutectic carbides is 1% or more. However, when the area ratio of eutectic carbides exceeds 35%, high-hardness eutectic carbides rather increase attackability to a mating member, so that the mating member is worn, and that the piston has reduced seizure resistance and ductility. Accordingly, the area ratio of eutectic carbides in the microstructure is restricted to 1-35%. Incidentally, the area ratio means a total area percentage of eutectic carbides per the area of the entire measured field.

In addition, the eutectic carbides exist in the microstructure not in a uniformly dispersed state, but in the form of a eutectic colony, an assembly of eutectic carbides and a matrix phase (matrix microstructure), and the eutectic colonies are dispersed in the matrix phase. Because of such microstructure, the piston has improved seizure resistance without losing ductility largely. As schematically shown in FIG. 5, the eutectic colony is an assembly of fine eutectic carbides 51 and a matrix phase 53, the eutectic carbides 51 being densely crystallized in the matrix phase 53. As described above, high-hardness eutectic carbides contribute to having wear resistance and improving seizure resistance. Further, forming eutectic colonies dispersed in the microstructure, they improve seizure resistance. Namely, when used as a piston, a relatively low-hardness (soft) matrix phase existing between the eutectic carbides in the eutectic colonies or between the eutectic colonies is predominantly worn away by sliding with a mating member. The resultant dents act as reservoirs for lubricating oil, etc., thereby providing the piston with improved oil retainability and thus improved seizure resistance. Though increase in carbides usually lowers ductility, the decrease of ductility is drastically suppressed because the carbides exist as fine eutectic carbides surrounded by the matrix phase.

In the sliding of the piston of the present invention with a mating member, such as a cylinder liner made of high-P (phosphorus) flake graphite cast iron corresponding to FC300, the eutectic carbides in the piston alleviate the attackability of high-hardness steadite contained in a cylinder liner microstructure, so that the piston avoids scuffing and thus has good wear resistance. At the same time, synergistic effects with the above improvement in oil retainability provide the piston with excellent seizure resistance. In the sliding with a mating member, such as a piston pin made of carburized and quenched Cr-Mo steel or Cr steel, the eutectic carbides contained in the piston suppresses the friction of the piston by a high-hardness carburized phase contained in the piston pin, thereby providing the piston with excellent wear resistance and seizure resistance.

In the internal engine piston of the present invention, the average equivalent-circle diameter of the eutectic carbides is preferably 3 μm or less. The eutectic carbides having an average equivalent-circle diameter of 3 μm or less have a reduced notch sensitivity, thereby providing the piston with good machinability without drastically lowering ductility. Further, the effect of suppressing abrasive wear due to the detachment of eutectic carbides further improves the seizure resistance. Incidentally, the average equivalent-circle diameter of eutectic carbides is an average of diameters of circles (pseudo-circles) each having the same area as that of each eutectic carbide. 2

The number of the eutectic colonies each having an area of $50 \mu m^2$ or more is preferably 10 or more in a cross section area of 1 $mm^2$ (namely, per a unit square millimeter area) in the microstructure. With the sizes of the eutectic colonies and their number per a unit area in the microstructure restricted as described above, the wear resistance and oil retainability of the piston, its attackability to a mating member, etc. are well balanced, thereby further improving the seizure resistance of the piston.

To form the eutectic carbides, the cast steel need only contain at least one of IVa and Va elements such as Ti, Zr, Hf, V, Nb and Ta. These elements are combined with C to make the eutectic carbides finer, thereby crystallizing them in the form of an eutectic colony, an assembly in which the eutectic carbides are surrounded by the matrix phase, and thus contributing to the improvement of seizure resistance and wear resistance. Particularly when the eutectic carbides include Nb carbides (NbC), not only seizure resistance and wear resistance but also castability and machinability are preferably improved by functions described below.

BEST MODE FOR CARRYING OUT THE INVENTION

Figure 1:
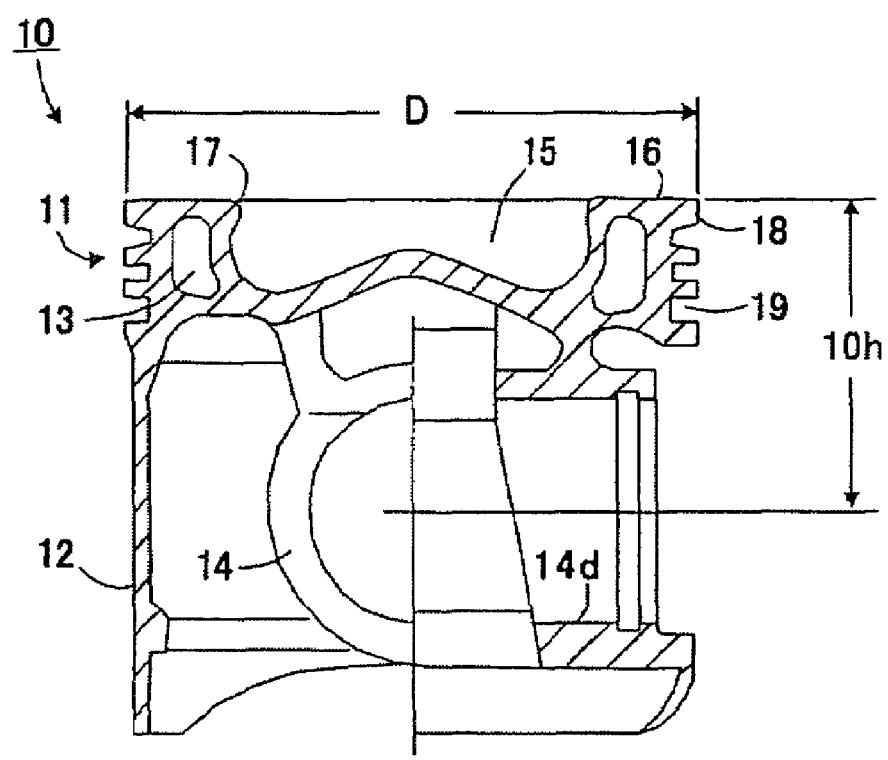
FIG. 1 is a cross-sectional view showing the piston of the present invention.

[1] Composition of Cast Steel (A) First Cast Steel (α-P Cast Steel)

(1) C: 0.8% or Less

C forms eutectic carbides, lowers a solidification temperature, and improves the castability of a melt, namely improves the flowability of a melt during casting, etc. The last effect is extremely important when a thin piston is cast. However, when C exceeds 0.8%, an area ratio of the eutectic carbides crystallized becomes as much as more than 35%, and precipitated carbides of Cr, etc. increase, rather decreasing seizure resistance and ductility and increasing attackability to a mating member. Accordingly, C is 0.8% or less. The C content is preferably 0.1-0.55%, more preferably 0.3-0.55%.

(2) Si: 3% or Less

Si has a function as a deoxidizer of a melt, securing castability by preventing gas defects due to a CO gas, etc. When Si exceeds 3%, the thermal shock resistance and machinability decrease. Accordingly, Si is 3% or less. Si is preferably 0.2-2%.

(3) Mn: 3% or Less

Mn deoxidizes a melt and forms non-metallic inclusions, thereby improving machinability. However, when Mn exceeds 3%, the toughness decreases. Accordingly, Mn is 3% or less. Mn is preferably 0.3-3%, more preferably 0.3-2%.

(4) Ni: 3% or Less

Ni suppresses decrease in high-temperature yield strength and high-temperature strength and secures high-temperature rigidity even when the piston temperature is elevated to 450° C. or higher, thereby keeping dimensional accuracy of the precisely worked piston, and preventing such troubles as wear, blowby, scuffing, seizure, breakage, etc. The content of Ni having such functions is 3% or less, preferably 1% or less.

(5) Cr: 6% or Less

Cr has a function of strengthening a matrix microstructure, thereby increasing a high-temperature yield strength. It also forms a passive film on a piston surface, reducing the chance that the matrix microstructure of the piston is brought into direct contact with a mating member. However, when Cr exceeds 6%, the machinability of the cast steel decreases. Accordingly, Cr is 6% or less. The Cr content is more preferably 4% or less, particularly 3% or less.

(6) Cu: 6% or Less

Cu is finely precipitated in a matrix microstructure, improving self-lubrication and preventing seizure. However, Cu exceeding 6% decreases high-temperature rigidity and ductility. Accordingly, Cu is 6% or less. Cu is preferably 1-4%.

(7) Nb: 0.01-3%

Nb is combined with C to crystallize fine eutectic carbides (NbC) in the form of eutectic colonies, thereby improving the seizure resistance and wear resistance of the piston. It further improves not only the flowability of a melt during casting, but also the castability by preventing casting defects such as shrinkage cavities generated by solidification shrinkage, breakage (thermal cracking), etc. In addition, Nb prevents the formation of coarse precipitated carbides such as Cr carbides, etc., thereby suppressing the decrease of ductility and the attackability to a mating member, and securing machinability. It also has a function of forming carbonitrides in addition to the eutectic carbides, thereby strengthening the pearlite. To obtain the above effects, 0.01% or more of Nb is needed. On the other hand, when Nb exceeds 3%, the area ratio of eutectic carbides exceeds 35%, rather decreases seizure resistance, ductility, thermal cracking resistance and machinability, and increasing the attackability to a mating member. Accordingly, Nb is 0.01-3%. Nb is preferably 0.1-3%, more preferably 0.2-3%.

(8) S: 0.2% or Less

S has functions of forming sulfides with Mn and Cr for improving seizure resistance, and S-containing inclusions for improving the machinability of the cast steel. However, when S exceeds 0.2%, excess S-containing inclusions are formed, resulting in the deterioration of the thermal cracking resistance. To form sulfides in good balance to provide thermal cracking resistance, seizure resistance and machinability to a proper level, S is 0.2% or less. S is preferably 0.005-0.2%, more preferably 0.03-0.2%.

(9) Mo: 5% or Less

To increase high-temperature strength, Mo is 5% or less, preferably 1% or less.

(10) Co: 5% or Less

Co is dissolved in a matrix microstructure to improve high-temperature yield strength, high-temperature strength, and high-temperature rigidity. Accordingly, Co is 5% or less, preferably 3% or less.

(11) At Least One of Al, Mg and Ca: 0.04% or Less

Al, Mg and Ca may be added, because they are effective as deoxidizers of a melt, functioning to form and finely disperse nuclei of sulfides effective for machinability. If they are contained excessively, however, they remain in the matrix microstructure as non-metallic inclusions, decreasing thermal cracking resistance. Accordingly, at least one of Al, Mg and Ca may be contained in an amount of 0.04% or less, if necessary.

(12) Other Elements

The IVa and Va elements such as Ti, Zr, Hf, V, Ta, etc. have the same effects as those of Nb. V and Ti are preferably 0.5% or less each. In addition, W may be contained by 5% or less, B may be contained by 0.05% or less, and N may be contained by 0.1% or less.

(B) Second Cast Steel (δ-M Cast Steel)

(1) C: 0.1-0.8%

Like the first cast steel, C is indispensable to form eutectic carbides, having a function to improve castability. However, when C exceeds 0.8%, the area ratio of the crystallized eutectic carbides becomes as much as more than 35%, increasing the precipitated carbides of Cr, etc., thereby rather decreasing seizure resistance and ductility, and increasing the attackability to a mating member. Accordingly, C is 0.1-0.8%. C is preferably 0.1-0.55%, more preferably 0.1-0.4%.

(2) Si: 3% or Less

Si is 3% or less, preferably 0.2-2%, for the same reasons as in the first cast steel.

(3) Mn: 3% or Less

Mn is 3% or less, preferably 0.3-3%, for the same reasons as in the first cast steel.

(4) Ni: 10% or Less

Ni is preferably 0.5-6%, for the same reasons as in the first cast steel.

(5) Cr: 30% or Less

Cr forms a passive film on a piston surface, thereby reducing the chance that the matrix microstructure of the piston is brought into direct contact with a mating member. It also turns the matrix microstructure to martensitic in combination with Ni and Cu, thereby strengthening the piston. More than 30% of Cr would not provide further improved effects, but increase an alloy cost, precipitated carbides with C, and the attackability to a mating member and decrease the ductility and machinability of the product. Accordingly, Cr is 30% or less. Cr is preferably 6-20%.

(6) Cu: 6% or Less

Cu is finely precipitated in the matrix microstructure, to increase self-lubrication and prevent seizure. However, because Cu exceeding 6% decreases high-temperature rigidity and ductility, Cu is 6% or less. Cu is preferably 1-4%.

(7) Nb: 0.05-8%

Nb is combined with C to crystallize fine eutectic carbides (NbC) in the form of eutectic colonies, thereby increasing the seizure resistance and wear resistance of the piston. It also improves castability by increasing the flowability of a melt during casting, and preventing casting defects such as shrinkage cavities generated by solidification shrinkage, breakage (thermal cracking), etc. Nb further reduces the formation of coarse precipitated carbides such as Cr carbides, etc., thereby suppressing decrease in ductility and increase in the attackability to a mating member, and securing machinability. Further, NbC is effective to increase high-temperature yield strength. To obtain such effects, 0.05% or more of Nb is needed. On the other hand, when Nb exceeds 8%, the area ratio of eutectic carbides becomes as much as more than 35%, rather decreasing seizure resistance, ductility, thermal cracking resistance and machinability, and increasing the attackability to a mating member. Accordingly, Nb is 0.05-8%. Nb is preferably 0.2-5%, more preferably 0.2-3.5%.

(8) S: 0.2% or Less

S forms sulfides with Mn and Cr to improve seizure resistance and S-containing inclusions to decrease thermal cracking resistance, with its internal lubrication function improving machinability. However, when S exceeds 0.2%, excess S-containing inclusions are formed, resulting in the deterioration of thermal cracking resistance. To form sulfides in good balance to provide thermal cracking resistance, seizure resistance S containing inclusions in good balance to provide both thermal cracking resistance and machinability to a proper level, S is 0.2% or less, preferably 0.05-0.2%, more preferably 0.1-0.2%.

(9) Mo: 5% or Less

Mo is 5% or less, preferably 3% or less, for the same reasons as in the first cast steel.

(10) Co: 5% or Less

Co is 5% or less, preferably 3% or less, for the same reasons as in the first cast steel.

(11) Ratios of C, Ni and Nb

The amounts of C, Ni and Nb preferably meet the requirement of $0.05<(C\%+0.15 Ni\% -0.12 Nb\%) <0.8$ (by mass). To cast a piston at a low cost, inexpensive raw materials should be used. Some scraps as raw materials should be cast with a high C content to secure castability such as melt flowability, etc., during casting. In the δ-M cast steel, a larger C content may lower an Ms point, leaving too much austenite at room temperature, thereby failing to obtain high-temperature yield strength and high-temperature rigidity. By restricting Nb functioning to form NbC, lower a C content in an austenite, and thus prevent the lowering of the Ms point of the matrix, and Ni lowering the Ms point to a range of $0.05<(C\%+ 0.15 Ni\%-0.12 Nb\%)\leqq 0.8$, the desired high-temperature yield strength and high-temperature rigidity can be obtained.

(12) At Least One of Al, Mg and Ca: 0.04% or Less

At least one of Al, Mg and Ca may be contained in an amount of 0.04% or less, for the same reasons as in the first cast steel.

(13) Other Elements

The IVa and Va elements such as Ti, Zr, Hf, V, Ta, etc. have the same effects as those of Nb. V and Ti are preferably 0.5% or less each. In addition, W may be contained by 5% or less, B may be contained by 0.05% or less, and N may be contained by 0.1% or less.

(14) Inevitable Impurities

P inevitably introduced from raw materials is preferably as little as possible, because it lowers the toughness of the cast steel. P is preferably 0.05% or less.

[2] Structure and Properties of Internal Engine Piston

The cast steel preferably has a microstructure in which the area ratio of eutectic carbides is 1-35%, and the eutectic carbides form eutectic colonies (assemblies of the eutectic carbides and the matrix phase). The eutectic carbides preferably have an average equivalent-circle diameter of 3 μm or less. The number of eutectic colonies each having an area of 50 μm$^2$ or more is preferably 10 or more per a unit cross section area (1 mm$^2$) of the microstructure. The eutectic carbides preferably contain Nb carbides.

In the first and second internal engine pistons, the area ratio of sulfides including at least one of Mn and Cr is preferably 0.2-3.0% in the microstructure, and the number of sulfides each having a circularity of 0.7 or more is preferably 70% or more of the total number of sulfides.

The piston formed by a proper material selected from various types of cast steel having heat resistance, corrosion resistance and wear resistance has sufficient high-temperature yield strength, high-temperature rigidity and thermal cracking resistance, even when the piston temperature is elevated to 450° C or higher, and when the combustion pressure is elevated to 20 MPa or more. For instance, the cast steel has higher thermal cracking resistance and high-temperature rigidity than those of spheroidal graphite cast iron, etc.. Accordingly, the cast steel suffers from less thermal cracking in a combustion chamber subjected to high temperatures and nearby lips, and keeps a shape dimension because of light weight even when main portions are made thinner, and is resistant to such problems as wear, blowby, scuffing, seizure, and breakage, without damaging the performance of an engine. Further, because the cast steel reduces the weight of a piston and makes the compression height smaller, it is possible to reduce the weight of the entire engine, increase the power of the engine while reducing its fuel consumption, reduce engine noises, and downsize an engine. The restriction of the area ratio of eutectic carbides secures sufficient ductility (room-temperature elongation), causing no cracking and breakage during use in an engine, in the production of parts, in assembling to the engine, etc.

The cast steel has a 0.2-% yield strength of 350 MPa or more and a Young's modulus of 140 GPa or more in a range of 350° C. to 500° C. Specifically, in a range of 350-500° C., the 0.2-% yield strength is preferably 400 MPa or more at 350° C., 350 MPa or more at 450° C., and 300 MPa or more at 500° C. The Young's modulus, an indicator of high-temperature rigidity, is desirably 100 GPa or more at a piston temperature of 450° C. or higher. With such high-temperature yield strength and rigidity, a high thermal cracking resistance is obtained by their synergistic effects. The room-temperature elongation, an indicator of ductility, can be 3.0% or more, an acceptable level for practical applications.

The average linear thermal expansion coefficient between room temperature and 500° C., an indicator of low thermal expansion, is preferably $10\text{-}16\times10^{-6}/°$ C. The average linear thermal expansion coefficient of the piston is thus substantially equal to that of a cylinder liner made of flake graphite cast iron ($13.1\times10^{-6}/°$ C. in a temperature range of 20-480° C.), properly keeping clearance between the piston and the cylinder liner small in a temperature range from room temperature to 450-500° C., and thus reducing oil consumption for lubrication. In addition, so-called blowby, a phenomenon that a combustion gas escapes to a crankcase through clearances between the piston, piston rings and the cylinder liner, is reduced to secure engine power. Further, oil films formed between the piston, the piston rings, and the cylinder liner are not disrupted to suppress the wear of these parts, reducing the engine noise.

[3] Production Method of Internal Engine Piston (A) α-P Cast Steel Piston

The production method of the first internal engine piston comprises holding α-P cast steel at 850° C. or higher after casting, and then air-cooling it. Because an as-cast piston may have different solidification and cooling speeds depending on its portions due to product shapes, mold designs, mold shapes, etc., it is preferable to homogenize the material by a heat treatment, thereby adjusting its wear resistance, hardness and mechanical properties. A mixed microstructure of proeutectoide ferrite and dense pearlite can be formed by a normalizing treatment which comprises holding the cast steel at 850° C. or higher after casting, and air-cooling it, thereby securing strength and wear resistance necessary for the piston.

When the heating temperature is lower than 850° C., complete austenitization does not occur. To austenitize the entire microstructure, heating should be 850° C. or higher. The preferred heating-temperature-holding temperature is 900-950° C.

The heating-temperature-holding time may vary depending on the size, shape, etc. of the piston, but it may be 0.5 hours or longer for small pistons, and 1 hour or longer for large pistons.

(B) δ-M Cast Steel Piston

The production method of the second internal engine piston comprises, after casting δ-M cast steel, (a) holding it at 450° C. or higher, and then air-cooling it, or (b) holding it at 1000° C. or higher, rapidly cooling it, holding it at 450° C. or higher, and then air-cooling it. Because the piston is subjected to engine-performance-deteriorating problems such as blowby, wear, seizure and breakage when permanent deformation occurs due to the change of a material during use, the change of a material should be made as small as possible in advance. For this purpose, it is effective to stabilize the material by holding it at a temperature higher than the temperature of using the piston. Specifically, it is preferable to conduct an aging treatment after casting, which comprises holding the cast piston at 450° C. (piston-using temperature) or higher and air-cooling it. When a solution treatment comprising holding it at 1000° C. or higher after casting and rapidly cooling it is conducted before this aging treatment, brittle carbides (for instance, Cr carbides) in the material are preferably dissolved in the matrix, securing toughness and ductility.

The heating-temperature-holding time in the solution treatment and the aging treatment may vary depending on the size, shape, etc. of a piston, but it may be 0.5 hours or longer for the former and 2 hours or longer for the latter in a small piston, and 1.5 hours or longer for the former and 4 hours or longer for the latter in a large piston.

The present invention will be explained in further detail referring to Examples below, without intention of restricting the present invention thereto.

EXAMPLES 1-20, COMPARATIVE EXAMPLES 1-4, CONVENTIONAL EXAMPLES 1, 2

(1) Production of Samples

Table 1 shows the chemical compositions (% by mass) of samples used in Examples, Comparative Examples and Conventional Examples. The samples of Examples 1-20 were made of α-P cast steel having a small Cr content (within the composition range of the present invention), and the samples of Comparative Examples 1-4 were made of α-P cast steel outside the composition range of the present invention. Comparative Example 1 used cast steel containing too little Nb, Comparative Example 2 used cast steel containing too much Nb, Comparative Example 3 used cast steel containing too much S, and Comparative Example 4 used cast steel containing too little Nb and too much S. Conventional Example 1 used spheroidal graphite cast iron (JIS FCD 600) disclosed in JP 10-85924 A, and Conventional Example 2 used forged steel disclosed in U.S. Pat. No. 5,136,992.

Each cast steel of Examples 1-20 and Comparative Examples 1-4 was melted in a 100-kg, high-frequency furnace with a basic lining, poured into a ladle at 1550° C. or higher, and immediately poured into a one-inch Y-block at 1500° C. or higher. Each cast steel of Examples 1-20 (other than Examples 16 and 20) and Comparative Examples 1-4 was subjected to a normalizing heat treatment comprising holding the cast steel at 850-1000° C. for 1 hour after casting, and then air-cooling it, to provide a sample having a matrix microstructure composed of a ferrite phase and a pearlite phase.

The sample of Conventional Example 1 was produced by melting a spheroidal graphite cast iron (corresponding to JIS FCD 600) in a 100-kg, high-frequency furnace with an acidic lining, conducting a spheroidizing treatment by a sandwiching method using Fe-75% Si and Fe—Si-4% Mg during pouring the melt into a ladle at 1500° C. or higher, conducting a secondary inoculation with Fe-75% Si immediately before pouring from the ladle, and pouring the melt into a one-inch Y-block. The sample of Conventional Example 2 made of cast steel having a composition corresponding to the forged steel piston disclosed in U.S. Pat. No. 5,136,992 was produced by forming an ingot by vacuum melting, forging the ingot at 1100° C., and conducting a normalizing heat treatment from 950° C.

TABLE 1

| No.[1] | Chemical Composition (% by mass) Other Than Fe | | | | | | | | | |
|---|---|---|---|---|---|---|---|---|---|---|
| | C | Si | Mn | S | Ni | Cr | Cu | Nb | V | Others |
| Example 1 | 0.09 | 0.16 | 0.22 | 0.003 | 0.01 | 0.02 | 0.02 | 0.01 | — | — |
| Example 2 | 0.11 | 0.25 | 0.32 | 0.006 | 0.04 | 0.09 | 0.03 | 0.11 | — | — |
| Example 3 | 0.20 | 0.21 | 0.32 | 0.021 | 0.12 | 0.25 | 0.05 | 0.17 | — | — |
| Example 4 | 0.54 | 1.44 | 0.56 | 0.084 | 0.87 | 1.66 | 1.59 | 0.59 | — | — |
| Example 5 | 0.55 | 1.95 | 1.97 | 0.147 | 0.98 | 2.93 | 3.66 | 2.46 | — | — |
| Example 6 | 0.79 | 2.87 | 2.56 | 0.194 | 2.86 | 5.98 | 5.94 | 3.00 | — | — |
| Example 7 | 0.20 | 0.55 | 2.86 | 0.030 | 0.50 | 0.10 | 0.11 | 0.06 | — | — |
| Example 8 | 0.31 | 0.87 | 1.52 | 0.033 | 0.11 | 0.08 | 1.10 | 0.10 | — | — |
| Example 9 | 0.55 | 2.47 | 0.97 | 0.022 | 0.07 | 0.05 | 2.50 | 0.50 | — | — |
| Example 10 | 0.37 | 2.51 | 0.30 | 0.150 | 2.70 | 0.31 | 0.10 | 0.37 | — | — |
| Example 11 | 0.40 | 0.91 | 0.40 | 0.030 | 0.05 | 3.16 | 0.08 | 0.48 | — | — |
| Example 12 | 0.41 | 2.36 | 0.68 | 0.022 | 0.05 | 5.99 | 0.01 | 0.12 | — | — |
| Example 13 | 0.30 | 0.65 | 0.65 | 0.033 | 0.11 | 0.08 | 5.80 | 0.05 | — | — |
| Example 14 | 0.35 | 0.80 | 1.98 | 0.022 | 0.08 | 0.03 | 0.08 | 0.04 | 0.12 | Ti: 0.008 |
| Example 15 | 0.42 | 0.68 | 1.01 | 0.040 | 0.08 | 0.10 | 0.03 | 0.31 | 0.03 | Ti: 0.004 |
| Example 16* | 0.42 | 0.68 | 1.01 | 0.040 | 0.08 | 0.10 | 0.03 | 0.31 | 0.03 | Ti: 0.004 |
| Example 17 | 0.40 | 0.89 | 0.41 | 0.120 | 0.10 | 0.10 | 0.12 | 0.06 | — | Mo: 1.69 |
| Example 18 | 0.46 | 0.76 | 0.33 | 0.132 | 0.09 | 0.12 | 0.09 | 0.06 | — | Co: 2.52 |
| Example 19 | 0.43 | 0.61 | 1.01 | 0.020 | 0.10 | 0.03 | 3.70 | 0.20 | — | Al: 0.021 |
| Example 20* | 0.43 | 0.61 | 1.01 | 0.020 | 0.10 | 0.03 | 3.70 | 0.20 | — | Al: 0.021 |
| Comp. Ex. 1 | 0.41 | 0.80 | 1.00 | 0.020 | 0.11 | 0.10 | 0.12 | 0.005 | — | — |
| Comp. Ex. 2 | 0.38 | 0.85 | 0.98 | 0.019 | 0.12 | 0.15 | 0.12 | 3.22 | — | — |
| Comp. Ex. 3 | 0.45 | 0.87 | 1.10 | 0.211 | 0.11 | 0.05 | 0.05 | 0.04 | — | — |
| Comp. Ex. 4 | 0.57 | 0.55 | 1.75 | 0.209 | 0.03 | 0.03 | 0.03 | 0.005 | 0.50 | — |
| Conv. Ex. 1 | 3.70 | 2.23 | 0.35 | 0.006 | 0.03 | 0.02 | 0.67 | — | — | Mg: 0.042 |
| Conv. Ex. 2 | 0.41 | 0.65 | 1.17 | 0.030 | 0.10 | 0.11 | 0.11 | — | 0.08 | — |

Note:
[1]"Comp. Ex." means Comparative Example, and "Conv. Ex." Means Conventional Example.
*No heat treatment was conducted.

(2) Analysis of Eutectic Carbides and Eutectic Colonies

The metal microstructure of each sample was observed to analyze eutectic carbides and eutectic colonies. A test piece cut out of each sample was embedded in a resin, ground with emery papers to #1000, further ground with diamond particles of 15 μm, 9 μm, 3 μm and 1 μm, respectively, and finish-ground with colloidal silica successively. Thereafter, an observation surface of each test piece was etched by a Nital etching solution.

Using an image analyzer (IP-1000, available from Asahi Kasei Corp.), the area ratio (%) of eutectic carbides and an average equivalent-circle diameter (μm) were measured in 5 arbitrary fields of 30396.6 μm$^2$ at a magnification of 200 times. The area ratio of eutectic carbides was obtained by dividing the total area of the eutectic carbides in each field by the total field area (30396.6 μm$^2$) and averaging the resultant ratios over 5 fields. Non-metal inclusions were not included in the measurement of the area ratio of eutectic carbides and the average equivalent-circle diameter. The results are shown in Table 2.

Figure 5:
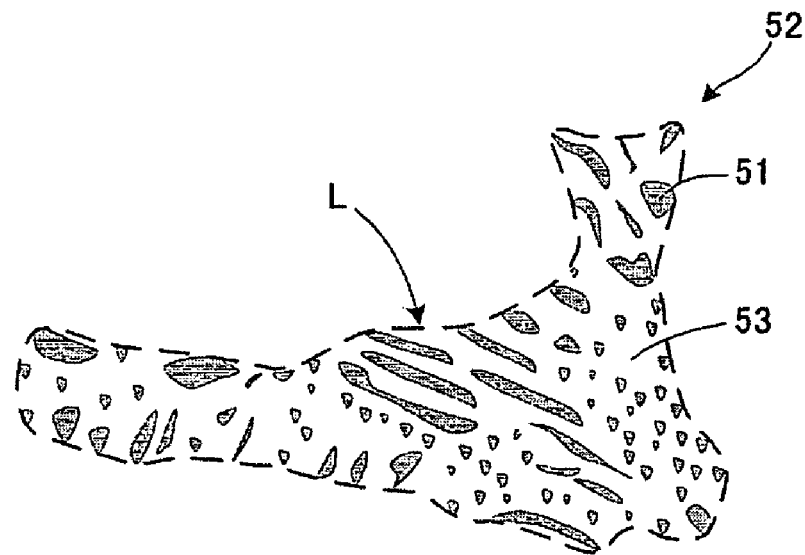
FIG. 5 is a schematic view showing a eutectic colony comprising eutectic carbides.

With respect to the number of eutectic colonies each having an area of 50 μm$^2$ or more, a ground, etched sample was photographed by an optical microscope at a magnification of 100 times in 5 arbitrary fields. In the resultant photomicrographs, a cluster of plural eutectic carbides close to or in contact with each other within 10 μm is defined as one eutectic colony. As shown in the schematic view of FIG. 5, the area of the eutectic colonies is defined as an area surrounded by an envelope L drawn such that it encloses the eutectic colonies 52. When the eutectic carbides 51 are small and unclear, or when distances between the eutectic carbides 51 are unclear, an observation area was enlarged to 100 times or more to determine their sizes and distances. The number of eutectic colonies each having an area of 50 μm$^2$ or more was then measured by the above image analyzer, and divided by the measured area. The measured values were averaged over 5 fields to determine the number of eutectic colonies per a unit area (1 mm2). The results are shown in Table 2.

(3) Seizure Resistance

Each sample was subjected to a reciprocal kinetic friction wear test reproducing the sliding of a piston pin on a piston, and a pin-on-disk test reproducing the sliding of a piston on a cylinder liner, to evaluate seizure resistance.

(a) Pin Seizure Resistance

Figure 7:
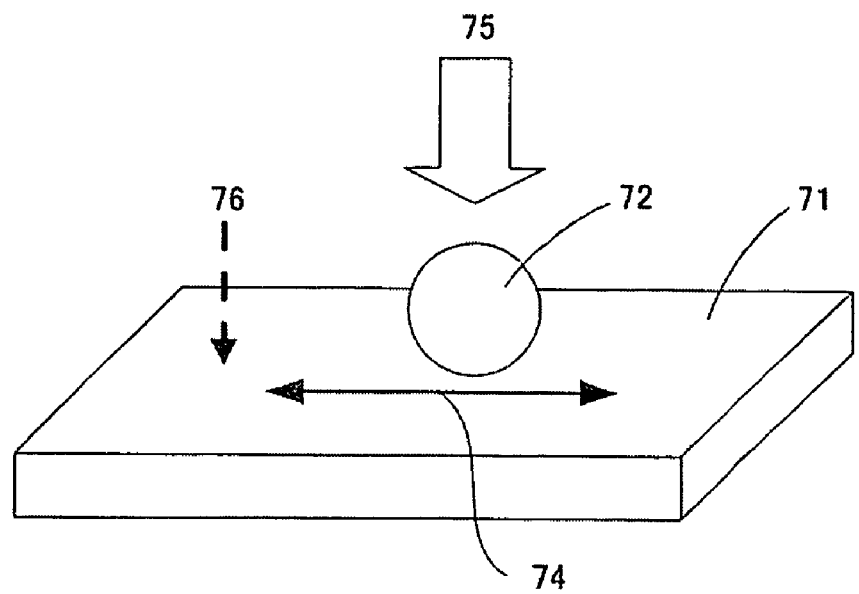
FIG. 7 is a schematic view showing a reciprocal kinetic friction wear test.

The reciprocal kinetic friction wear test was conducted by the following procedure. Each sample was first worked to a planar test piece 71 of 60 mm 20 mm x 5 mm, and ground to an average surface roughness Ra (JIS B 0601) of 0.1-0.2 μm. As shown in FIG. 7, each planar test piece 71 was attached to a reciprocal kinetic friction detector (AFT-15M available from ORIENTEC Co., Ltd.), which is not shown. Lubricating oil (corresponding to 10W-30) was dropped onto the planar test piece 71 in a direction shown by an arrow 76. With a ball 72 of 5mm in diameter made of high-carbon chromium bearing steel SUJ2 (JIS G 4805), which corresponded to the pin as a mating member, in contact with plantar test piece 71 at a thrust load 75 of 58.8 N, the planar test piece 71 was reciprocally slid in a direction shown by an arrow 74 at a sliding width of 1 cm and a reciprocal period of 1.6 seconds, to measure a wearing force. The number of reciprocal sliding (hereinafter referred to as "number of wear") was counted until the wearing force reached 6.86 N, and the seizure resistance to a pin was evaluated by the following standards:

Excellent: The number of wear was 400 or more.

Good: The number of wear was 300 or more and less than 400.

Fair: The number of wear was 200 or more and less than 300.

Poor: The number of wear was less than 200.

(b) Liner Seizure Resistance

Figure 8:
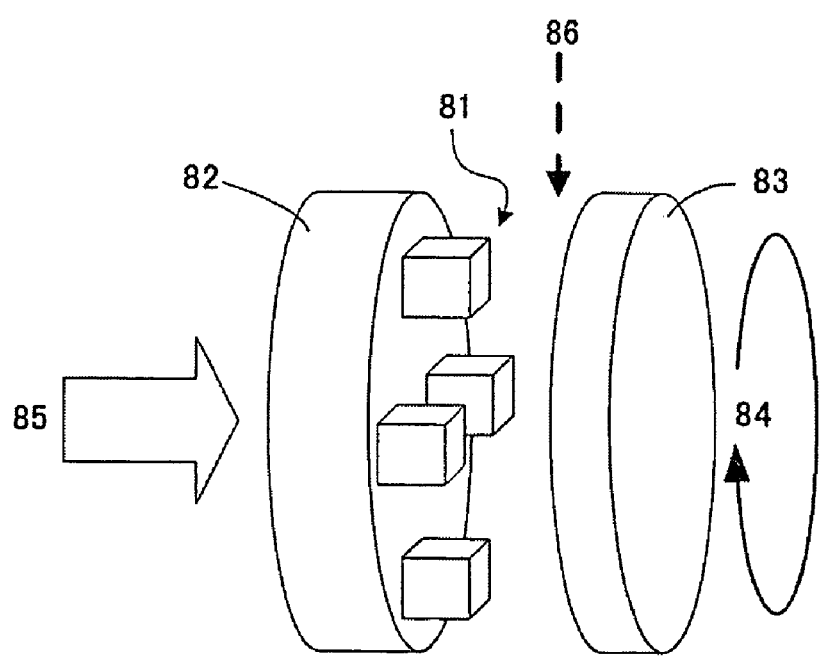
FIG. 8 is a schematic view showing a pin-on-disk test.
Figure 9:
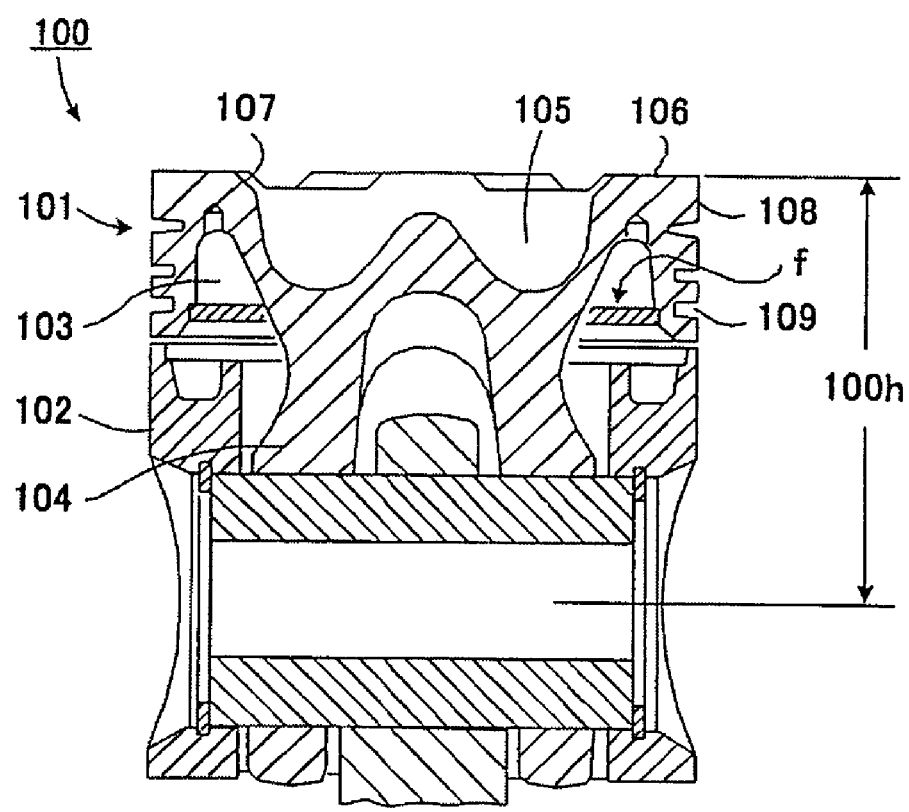
FIG. 9 is a cross-sectional view showing a conventional piston comprising separately produced head portion and skirt portion, the head portion comprising a pin boss portion.

The pin-on-disk test was conducted by a test machine shown in FIG. 8. The pin-on-disk test machine comprises a disk-shaped holder 82 for holding test pieces, a disk 83 made of a material corresponding to a mating member and disposed opposite to the disk-shaped holder 82, a means (not shown) mounted to the disk-shaped holder 82 for applying a thrust load 85 to the test pieces, and a means (not shown) for rotating the disk 83 in a direction shown by an arrow 84.

Each sample was machined to a rectangular prism shape of 5 mm×5 mm×10 mm, and finish-worked to a surface roughness Ra of 0.5 μm or less to produce a pin-shaped test piece 81. The disk 83 of 80 mm in diameter and 12 mm in thickness was made of FC300 [high-P (phosphorus) flake graphite cast iron]. Four pin-shaped test pieces 81 attached to the disk-shaped holder 82 were brought into contact with the disk 83, and lubricating oil (corresponding to 10W-30) was dropped onto a contact surface of the test pieces 81 and the disk 83 in a direction shown by an arrow 86. In this state, the disk 83 was rotated to increase the thrust load 85 stepwise. The thrust load 85 is surface pressure on the contact surface of the pin-shaped test pieces 81 and the disk 83, and the rotation speed of the disk 83 is a sliding speed. The pin-on-disk test was conducted under the following conditions (1)-(7).

(1) Surface pressure at the start of the test: 15 kgf/cm$^2$.
(2) Surface pressure at the end of the test: 500 kgf/cm$^2$.
(3) Surface pressure increase pitch: 5 kgf/cm$^2$.
(4) Load-holding time at each surface pressure: 1 minute.
(5) Sliding speed of disk: 2 m/s.
(6) Lubricating oil temperature: 10° C. (viscosity grade 100).
(7) Lubricating oil supply conditions: After the lubricating oil was supplied at a test start surface pressure and at a speed of 10 cm$^3$/min for 1 minute, the supply of the lubricating oil was stopped.

A load when one of the pin-shaped test pieces 81 and the disk 83 was damaged was taken as a seizure load (kgf), and the seizure resistance to a liner was evaluated by the following standards:

Excellent: The seizure load was 120 kgf or more.
Good: The seizure load was 100 kgf or more and less than 120 kgf.
Fair: The seizure load was 80 kgf or more and less than 100 kgf.
Poor: The seizure load was less than 80 kgf.

The results of the reciprocal kinetic friction wear test and the pin-on-disk test are shown in Table 2.

TABLE 2

| No.[1] | Eutectic Carbides Area Ratio (%) | $D_{av}$[2] (μm) | Number of Eutectic Colonies[3] (/mm$^2$) | Seizure Resistance to Pin Number of Wear | Evaluation | Seizure Resistance to Liner Seizure Load (kgf) | Evaluation |
|---|---|---|---|---|---|---|---|
| Example 1 | 0.1 | 0.1 | 3 | 300 | Good | 101 | Good |
| Example 2 | 0.2 | 0.2 | 3 | 305 | Good | 105 | Good |
| Example 3 | 0.3 | 0.3 | 3 | 310 | Good | 110 | Good |
| Example 4 | 6 | 1.6 | 30 | 521 | Excellent | 125 | Excellent |
| Example 5 | 10.0 | 1.7 | 26 | 530 | Excellent | 130 | Excellent |
| Example 6 | 15.0 | 2.0 | 12 | 510 | Excellent | 120 | Excellent |
| Example 7 | 1.0 | 0.9 | 8 | 318 | Good | 115 | Good |
| Example 8 | 1.4 | 1.0 | 12 | 350 | Good | 119 | Good |
| Example 9 | 6.1 | 1.7 | 40 | 470 | Excellent | 150 | Excellent |
| Example 10 | 4.7 | 1.7 | 35 | 471 | Excellent | 140 | Excellent |
| Example 11 | 5.4 | 1.7 | 38 | 450 | Excellent | 140 | Excellent |
| Example 12 | 1.7 | 1.1 | 10 | 330 | Good | 130 | Excellent |
| Example 13 | 1.0 | 0.8 | 10 | 340 | Good | 110 | Good |
| Example 14 | 0.7 | 0.8 | 5 | 385 | Good | 125 | Excellent |
| Example 15 | 4.5 | 1.6 | 34 | 420 | Excellent | 125 | Excellent |
| Example 16* | 4.8 | 1.8 | 32 | 450 | Excellent | 130 | Excellent |
| Example 17 | 1.1 | 1.1 | 10 | 370 | Good | 125 | Excellent |
| Example 18 | 1.0 | 1.0 | 17 | 388 | Good | 120 | Excellent |
| Example 19 | 4.1 | 1.3 | 32 | 411 | Excellent | 135 | Excellent |
| Example 20* | 4.3 | 1.6 | 30 | 421 | Excellent | 137 | Excellent |
| Comp. Ex. 1 | 0.0 | — | — | 253 | Fair | 98 | Fair |
| Comp. Ex. 2 | 11.0 | 1.90 | 20 | 452 | Excellent | 120 | Excellent |
| Comp. Ex. 3 | 0.0 | — | — | 267 | Fair | 89 | Fair |
| Comp. Ex. 4 | 0 | — | — | 263 | Fair | 100 | Good |
| Conv. Ex. 1 | 0.0 | — | — | 289 | Fair | 102 | Good |
| Conv. Ex. 2 | 0.0 | — | — | 254 | Fair | 100 | Good |

Note:
[1]"Comp. Ex." means Comparative Example, and "Conv. Ex." means Conventional Example.
[2]Average corresponding circle diameter.
[3]The number of eutectic colonies of 50 μm$^2$ or more.
*No heat treatment was conducted.

As is clear from Table 2, the area ratio of eutectic carbides was less than 1% in Examples 1-3 and 14, and within the preferred range (1-35%) of the present invention in Examples 4-13 and 15-20. The average equivalent-circle diameter of the eutectic carbides was within the preferred range (3 μm or less) of the present invention in Examples 1-20. The number of eutectic colonies each having an area of 50 μm$^2$ or more per a unit area was within the preferred range (10/mm$^2$ or more) of the present invention in Examples other than Examples 1-3, 7 and 14. In the cast steel in which the number of eutectic colonies was less than 10/mm$^2$, there appear a lot of eutectic colonies crystallized in the microstructure, which were connected without dispersion to form coarse colonies.

It is clear from Table 2 that the number of wear in the reciprocal kinetic friction wear test was as many as 300 or more in Examples 1-20, indicating excellent seizure resistance to a pin. It is also clear by the pin-on-disk test that the seizure load was as high as 100 kgf or more in Examples 1-20, indicating excellent seizure resistance to a liner. On the other hand, the test piece of Comparative Example 2 containing as excessive Nb as 3.22% by mass exhibited poor thermal cracking resistance, despite excellent seizure resistance to a pin and a liner. The test pieces of other Comparative Examples were poor in seizure resistance to a pin and a liner.

Tendency was appreciated that the more the area ratio of eutectic carbides, the average equivalent-circle diameter and the number of eutectic colonies each having an area of 50 μm² or more per a unit area, the larger the seizure resistance (seizure resistance to a pin and a liner).

(4) Sulfides (a) Area Ratio of Sulfides

A test piece cut out of each sample was embedded in a resin, ground with emery papers to #1000, further ground with diamond particles of 15 μm, 9 μm, 3 μm and 1 μm, respectively, and then finish-ground with colloidal silica successively. A ground surface of each test piece was observed by an image analyzer (IP-1000) available from Asahi Kasei Corp. at a magnification of 200 times, and each sulfide particle was converted to a circle having the same area to determine its diameter. With respect to the sulfides corresponding to circles of 1.0 μm or more in diameter, their area ratios (%) in a field were determined. The results are shown in Table 3.

(b) Percentage of Sulfides Having a Circularity of 0.7 or More

The same test piece as above was observed by the image analyzer to get an image of each sulfide, from which the circularity of sulfides was calculated using the formula of (4×π×area of sulfide)/(peripheral length of sulfide)². The number of sulfides having a circularity of 0.7 or more was determined therefrom, to calculate its ratio to the total number of sulfides, which was defined as the percentage (%) of sulfides having a circularity of 0.7 or more. The results are shown in Table 3.

(5) Structure

The volume ratio (%) of an austenite (γ ratio) was measured using an X-ray stress analyzer (STRAINFLEX MSF-2M, available from Rigaku). The results are shown in Table 3.

(6) Room-Temperature Elongation

A No. 4 test piece was produced from each sample according to JIS Z 2201, and its room-temperature elongation (%) at 25° C. was measured by an Amsler tensile test machine. The results are shown in Table 3.

(7) High-Temperature Yield Strength

A test piece cut out of each sample was measured with respect to 0.2-% yield strength (MPa) at 350° C., 450° C. and 500° C., respectively, as a high-temperature yield strength, according to "High Temperature Tensile Test Method of Steel and Heat-Resistant Alloys" of JIS G 0567. The results are shown in Table 3.

TABLE 3

| No.[1] | Area Ratio of Sulfides (%) | Percentage of Sulfides Having Circularity ≧ 0.7 (%)[2] | γ Ratio (%) | Room-Temperature Elongation (%) | 0.2-% Yield Strength (MPa) at | | |
|---|---|---|---|---|---|---|---|
| | | | | | 350° C. | 450° C. | 500° C. |
| Example 1 | 0.0 | — | 0.0 | 29.7 | 378 | 321 | 279 |
| Example 2 | 0.0 | — | 0.0 | 28.1 | 369 | 331 | 286 |
| Example 3 | 0.1 | 96 | 0.0 | 24.5 | 401 | 341 | 298 |
| Example 4 | 1.1 | 88 | 0.0 | 8.8 | 467 | 387 | 354 |
| Example 5 | 1.3 | 85 | 0.0 | 7.9 | 488 | 401 | 384 |
| Example 6 | 1.7 | 84 | 0.0 | 3.7 | 504 | 410 | 345 |
| Example 7 | 0.3 | 87 | 0.0 | 23.5 | 412 | 356 | 308 |
| Example 8 | 0.3 | 88 | 0.0 | 19.6 | 433 | 370 | 312 |
| Example 9 | 0.3 | 88 | 0.0 | 12.4 | 510 | 403 | 336 |
| Example 10 | 1.2 | 81 | 0.0 | 3.0 | 521 | 435 | 356 |
| Example 11 | 0.4 | 88 | 0.0 | 9.8 | 567 | 452 | 374 |
| Example 12 | 0.2 | 90 | 0.0 | 5.0 | 753 | 525 | 457 |
| Example 13 | 0.3 | 87 | 0.0 | 6.3 | 455 | 398 | 345 |
| Example 14 | 0.2 | 85.1 | 0.0 | 8.7 | 411 | 366 | 301 |
| Example 15 | 0.6 | 90 | 0.0 | 14.6 | 450 | 374 | 310 |
| Example 16* | 0.6 | 88.9 | 0.0 | 13.3 | 410 | 322 | 298 |
| Example 17 | 1.1 | 84 | 0.0 | 2.2 | 743 | 510 | 420 |
| Example 18 | 1.0 | 88 | 0.0 | 4.0 | 576 | 453 | 378 |
| Example 19 | 0.2 | 88 | 0.0 | 4.5 | 550 | 453 | 396 |
| Example 20* | 0.3 | 87 | 0.0 | 4.0 | 575 | 462 | 388 |
| Comp. Ex. 1 | 0.2 | 92 | 0.0 | 18.0 | 399 | 354 | 308 |
| Comp. Ex. 2 | 0.1 | 98 | 0.0 | 4.5 | 564 | 441 | 368 |
| Comp. Ex. 3 | 3.1 | 68 | 0.0 | 16.5 | 401 | 342 | 301 |
| Comp. Ex. 4 | 3.2 | 62.5 | 0.0 | 7.9 | 470 | 388 | 312 |
| Conv. Ex. 1 | 0.0 | — | 0.0 | 9.7 | 411 | 358 | 245 |
| Conv. Ex. 2 | 0.7 | 54 | 0.1 | 16.8 | 449 | 377 | 303 |

Note:
[1]"Comp. Ex." means Comparative Example, and "Conv. Ex." means Conventional Example.
[2]A ratio of the number of sulfides having a circularity of 0.7 or more to the total number of sulfides.
*No heat treatment was conducted.

As is clear from Table 3, the area ratio of sulfides was in a preferred range of 0.2-3% in all Examples except for Examples 1-3, and the percentage of sulfides having a circularity of 0.7 or more was in a preferred range of 70% or more in all Examples except for Examples 1 and 2. The austenite ratio was 0% in all Examples, within the preferred range of 30% or less. With respect to the room-temperature elongation and the high-temperature yield strength, Examples 1-20 were substantially the same as Comparative Examples 1-4 and Conventional Examples 1 and 2.

(7) High-Temperature Rigidity

A planar test piece of 1.5 mm×10 mm×60 mm, whose entire surface was ground, was produced from each sample as a test piece for measuring high-temperature rigidity, according to JIS Z 2280, "Method of Testing High-Temperature Young's Modulus of Metal Materials." Each test piece was placed in a furnace at 350° C., 450° C. and 500° C., respectively, in the atmosphere, and vibrated by a free-vibration electrostatic driving method to detect a vibration resonance frequency, from which a Young's modulus (GPa) was calculated. The results are shown in Table 4.

(8) Thermal Cracking Resistance

Figure 6:
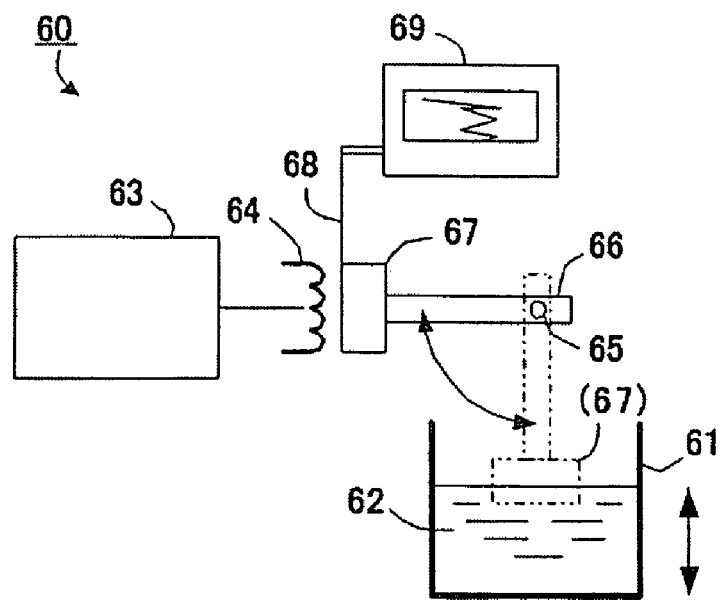
FIG. 6 is a schematic view showing a thermal cracking test machine.

Using a thermal cracking test machine 60 shown in FIG. 6, a thermal cracking resistance test was conducted. The thermal cracking test machine 60 comprises a vertically movable water bath 61 for storing a cooling water 62, a high-frequency oscillator 63, a high-frequency-oscillating coil 64 connected to the high-frequency oscillator 63, a rod 66 having a tip end, to which a test piece 67 was attached, a shaft 65 rotatably supporting the rod 66, a thermocouple 68 attached to the test piece 67, and a recorder 69 of temperature data connected to the thermocouple 68. The test piece 67 was worked to a diameter of 90 mm and a thickness of 50 mm.

After repeating a heating-cooling cycle (5 seconds) 1000 times, which comprised a step (1) that a surface of the horizontally kept test piece 67 was heated to 450° C. by the high-frequency-oscillating coil 64, a step (2) that after the test piece 67 was swung downward, the water bath 61 was elevated as indicated by a dotted line, so that the test piece 67 was rapidly cooled by the room-temperature cooling water 62, and a step (3) that the water bath 61 was moved downward, and the test piece 67 was returned to the original horizontal state, the test piece was measured with respect to the maximum crack length (μm) in its cross section as an index of thermal cracking resistance. The evaluation standards of the thermal cracking resistance are as follows:

Excellent: The maximum crack length was 50 μm or less.
Good: The maximum crack length was more than 50 μm and 100 μm or less.
Fair: The maximum crack length was more than 100 μm and 150 μm or less.
Poor: The maximum crack length was more than 150 μm.

The measurement results of the maximum crack length and the evaluation results of the thermal cracking resistance are shown in Table 4.

(9) Average Linear Thermal Expansion Coefficient Between Room Temperature and 500° C.

A test piece worked to a diameter of 5 mm and a thickness of 20 mm was measured with respect to thermal expansion between room temperature and 500° C. at a temperature-elevating speed of 3° C./minute in the atmosphere using a thermomechanical analyzer (THEMOFLEX TAS-200 TAS8140C, available from Rigaku). An average linear thermal expansion coefficient was calculated from the measured thermal expansion. The results are shown in Table 4.

TABLE 4

| No.[1] | Young's Modulus (GPa) at | | | Thermal Cracking Resistance | | Average Linear Thermal Expansion Coefficient Between Room Temperature and 500° C. ($\times 10^{-6}$/° C.) |
|---|---|---|---|---|---|---|
| | 350° C. | 450° C. | 500° C. | Maximum Crack Length (μm) | Evaluation | |
| Example 1 | 194 | 177 | 161 | 90 | Good | 12.9 |
| Example 2 | 193 | 173 | 160 | 94 | Good | 12.8 |
| Example 3 | 195 | 176 | 160 | 87 | Good | 12.4 |
| Example 4 | 192 | 175 | 158 | 80 | Excellent | 12.5 |
| Example 5 | 191 | 176 | 158 | 80 | Excellent | 12.1 |
| Example 6 | 193 | 177 | 157 | 88 | Good | 12.2 |
| Example 7 | 194 | 171 | 153 | 95 | Good | 11.8 |
| Example 8 | 196 | 172 | 153 | 94 | Good | 11.9 |
| Example 9 | 197 | 173 | 155 | 55 | Excellent | 12.1 |
| Example 10 | 197 | 164 | 157 | 51 | Excellent | 12.5 |
| Example 11 | 198 | 168 | 156 | 47 | Excellent | 12.4 |
| Example 12 | 197 | 168 | 158 | 50 | Excellent | 11.9 |
| Example 13 | 199 | 173 | 154 | 90 | Good | 12.6 |
| Example 14 | 195 | 173 | 155 | 89 | Good | 12.8 |
| Example 15 | 194 | 172 | 155 | 87 | Good | 12.6 |
| Example 16* | 193 | 168 | 154 | 98 | Good | 12.4 |
| Example 17 | 198 | 171 | 155 | 49 | Excellent | 12.4 |
| Example 18 | 195 | 174 | 157 | 60 | Excellent | 12.2 |
| Example 19 | 195 | 168 | 155 | 46 | Excellent | 12.0 |
| Example 20* | 195 | 168 | 155 | 46 | Excellent | 12.0 |
| Comp. Ex. 1 | 194 | 174 | 152 | 117 | Fair | 12.1 |
| Comp. Ex. 2 | 197 | 174 | 155 | 100 | Good | 12.6 |
| Comp. Ex. 3 | 194 | 171 | 151 | 178 | Poor | 12.6 |
| Comp. Ex. 4 | 195 | 176 | 148 | 156 | Poor | 12.6 |
| Conv. Ex. 1 | 175 | 160 | 135 | 325 | Poor | 13.1 |
| Conv. Ex. 2 | 194 | 174 | 155 | 121 | Fair | 14.0 |

Note:
[1]"Comp. Ex." means Comparative Example, and "Conv. Ex." means Conventional Example.
*No heat treatment was conducted.

With respect to high-temperature rigidity, Examples 1-20 were substantially the same as Comparative Examples 1-4 and Conventional Examples 1 and 2. However, with respect to the thermal cracking resistance, the maximum crack length was 100 μm or more in Comparative Examples 1-4 and Conventional Examples 1 and 2, but it was less than 100 μm in Examples 1-20.

These results revealed that the pearlitic cast steel meeting the requirements of the present invention had much higher seizure resistance and thermal cracking resistance than those of other materials, while holding the same room-temperature elongation, high-temperature yield strength and high-temperature rigidity as those of the other materials.

EXAMPLES 21-45, COMPARATIVE EXAMPLES 5-11

(1) Production of Sample

Table 5 shows the chemical compositions (% by mass) of samples used in Examples and Comparative Examples. The samples of Examples 21-45 were δ-M cast steel having a large Cr content within the composition range of the present invention, and the samples of Comparative Examples 5-11 were δ-M cast steel outside the composition range of the present invention. Comparative Example 5 showed cast steel containing too little C and S, and Comparative Examples 6 and 7 showed cast steel containing too little C and too much S. Comparative Examples 8-10 showed cast steel containing too much S, Comparative Example 11 showed cast steel containing too little Nb, and Comparative Example 12 showed cast steel containing too much Nb.

Each cast steel of Examples 21-45 and Comparative Examples 5-11 was melted in a 100-kg, high-frequency furnace with a basic lining, poured into a ladle at 1550° C. or higher, and immediately poured into a one-inch Y-block at 1500° C. or higher. The cast steel of Examples and Comparative Examples except for Example 31 and Comparative Examples 6, 8-10 and 12 was subjected to a solution treatment comprising keeping it at 1000-1200° C. for 1 hour after casting, and rapidly cooling it, and then to an aging treatment comprising keeping it at 550-630° C. for 2-4 hours and then air-cooling it. The matrix microstructure of each heat-treated cast steel contained a δ-ferrite phase and a martensite phase, with an austenite phase being less than 30%.

TABLE 5

| No.[1] | Chemical Composition Other Than Fe (% by mass) | | | | | | | | | | |
|---|---|---|---|---|---|---|---|---|---|---|---|
| | C | Si | Mn | S | Ni | Cr | Cu | Nb | V | Ti | Others |
| Example 21 | 0.10 | 0.15 | 0.21 | 0.005 | 0.48 | 5.87 | 0.04 | 0.05 | — | — | — |
| Example 22 | 0.12 | 0.18 | 0.35 | 0.027 | 0.51 | 6.24 | 0.03 | 0.15 | — | — | — |
| Example 23 | 0.11 | 0.22 | 0.32 | 0.052 | 0.52 | 6.05 | 1.27 | 0.21 | — | — | — |
| Example 24 | 0.13 | 0.21 | 0.31 | 0.054 | 1.79 | 8.26 | 2.14 | 0.38 | — | — | — |
| Example 25 | 0.24 | 0.35 | 0.42 | 0.102 | 2.84 | 12.48 | 2.53 | 0.51 | — | — | — |
| Example 26 | 0.39 | 1.02 | 0.98 | 0.148 | 3.15 | 13.51 | 2.76 | 3.49 | — | — | — |
| Example 27 | 0.55 | 1.92 | 1.95 | 0.197 | 5.76 | 18.24 | 3.97 | 4.95 | — | — | — |
| Example 28 | 0.78 | 2.88 | 2.63 | 0.198 | 9.58 | 19.76 | 5.82 | 7.96 | — | — | — |
| Example 29 | 0.10 | 0.64 | 0.66 | 0.025 | 3.97 | 16.52 | 2.99 | 0.56 | — | — | — |
| Example 30 | 0.11 | 0.70 | 0.65 | 0.051 | 4.02 | 16.41 | 2.85 | 0.90 | — | — | — |
| Example 31* | 0.11 | 0.70 | 0.65 | 0.051 | 4.02 | 16.41 | 2.85 | 0.90 | — | — | — |
| Example 32 | 0.27 | 0.65 | 0.50 | 0.060 | 3.87 | 15.92 | 2.99 | 2.60 | — | — | — |
| Example 33 | 0.47 | 0.66 | 0.59 | 0.060 | 3.91 | 16.65 | 2.75 | 4.99 | — | — | — |
| Example 34 | 0.17 | 0.68 | 0.56 | 0.052 | 3.93 | 16.64 | 2.88 | 1.55 | — | — | — |
| Example 35 | 0.16 | 0.61 | 0.49 | 0.063 | 4.56 | 14.77 | 3.12 | 1.46 | — | — | — |
| Example 36 | 0.17 | 0.66 | 0.44 | 0.128 | 3.98 | 16.50 | 2.97 | 1.55 | — | — | — |
| Example 37 | 0.18 | 0.55 | 0.65 | 0.198 | 3.96 | 16.44 | 3.05 | 1.57 | — | — | — |
| Example 38 | 0.11 | 0.56 | 0.48 | 0.060 | 4.03 | 16.10 | 3.00 | 0.30 | 0.008 | 0.004 | — |
| Example 39 | 0.12 | 0.58 | 0.47 | 0.061 | 3.89 | 16.10 | 2.90 | 1.00 | 0.008 | 0.005 | — |
| Example 40 | 0.29 | 0.57 | 0.47 | 0.066 | 5.00 | 16.46 | 3.00 | 2.47 | 0.009 | 0.008 | Mg: 0.032 |
| Example 41 | 0.18 | 0.56 | 0.48 | 0.060 | 3.76 | 16.37 | 3.00 | 1.59 | 0.008 | 0.005 | Ca: 0.034 |
| Example 42 | 0.43 | 0.55 | 0.50 | 0.071 | 4.00 | 15.50 | 2.80 | 4.10 | 0.009 | 0.007 | — |
| Example 43 | 0.12 | 0.72 | 0.58 | 0.053 | 3.97 | 16.25 | 2.76 | 0.90 | — | — | Mo: 2.59 |
| Example 44 | 0.11 | 0.68 | 0.57 | 0.048 | 4.01 | 16.38 | 2.81 | 0.88 | — | — | Co: 2.76 |
| Example 45 | 0.11 | 0.69 | 0.62 | 0.051 | 4.12 | 16.13 | 2.55 | 0.79 | — | — | Al: 0.035 |
| Comp. Ex. 5 | 0.07 | 0.63 | 0.55 | 0.035 | 4.11 | 16.78 | 2.99 | 0.40 | 0.007 | 0.003 | — |
| Comp. Ex. 6* | 0.07 | 0.60 | 0.41 | 0.220 | 3.94 | 16.60 | 3.00 | 0.31 | 0.008 | 0.005 | — |
| Comp. Ex. 7 | 0.07 | 0.60 | 0.41 | 0.290 | 3.94 | 16.60 | 3.00 | 0.31 | 0.007 | 0.005 | — |
| Comp. Ex. 8* | 0.15 | 0.60 | 0.41 | 0.237 | 3.94 | 16.60 | 3.02 | 1.61 | 0.008 | 0.005 | — |
| Comp. Ex. 9* | 0.55 | 0.55 | 0.48 | 0.310 | 4.07 | 16.30 | 3.00 | 0.30 | 0.008 | 0.004 | — |
| Comp. Ex. 10* | 0.18 | 0.58 | 0.48 | 0.408 | 6.54 | 16.30 | 3.00 | 1.50 | 0.007 | 0.008 | — |
| Comp. Ex. 11 | 0.22 | 0.44 | 0.86 | 0.016 | 4.06 | 15.52 | 2.98 | 0.04 | — | — | — |
| Comp. Ex. 12* | 0.19 | 0.60 | 0.90 | 0.033 | 3.88 | 16.37 | 3.11 | 8.57 | — | — | — |

Note:
[1]"Comp. Ex." means Comparative Example.
*No heat treatment was conducted.

| No.[1] | C % + 0.15 Ni % − 0.12 Nb % (% by mass) |
|---|---|
| Example 21 | 0.17 |
| Example 22 | 0.18 |

TABLE 5-continued

| | |
|---|---|
| Example 23 | 0.16 |
| Example 24 | 0.35 |
| Example 25 | 0.60 |
| Example 26 | 0.44 |
| Example 27 | 0.82 |
| Example 28 | 1.26 |
| Example 29 | 0.63 |
| Example 30 | 0.61 |
| Example 31* | 0.61 |
| Example 32 | 0.54 |
| Example 33 | 0.46 |
| Example 34 | 0.57 |
| Example 35 | 0.67 |
| Example 36 | 0.58 |
| Example 37 | 0.59 |
| Example 38 | 0.68 |
| Example 39 | 0.58 |
| Example 40 | 0.74 |
| Example 41 | 0.55 |
| Example 42 | 0.54 |
| Example 43 | 0.61 |
| Example 44 | 0.61 |
| Example 45 | 0.63 |
| Comp. Ex. 5 | 0.64 |
| Comp. Ex. 6* | 0.62 |
| Comp. Ex. 7 | 0.62 |
| Comp. Ex. 8* | 0.55 |
| Comp. Ex. 9* | 1.12 |
| Comp. Ex. 10* | 0.98 |
| Comp. Ex. 11 | 0.82 |
| Comp. Ex. 12* | −0.26 |

Note:
[1]"Comp. Ex." means Comparative Example, and "Conv. Ex." means Conventional Example.
*No heat treatment was conducted.

(2) Analysis of Eutectic Carbides and Eutectic Colonies

Each sample was measured with respect to the area ratio (%) of eutectic carbides and the average equivalent-circle diameter (μm), and the number of eutectic colonies each having an area of 50 μm$^2$ or more as in Examples 1-20. The results are shown in Table 6. The etching treatment of a surface to be observed was conducted by a mixed acid solution ($H_2O$: 10 cm$^3$, HCl: 20 cm$^3$, $HNO_3$: 4 cm$^3$, and $H_2SO_4$: 1.3 cm$^3$).

Figure 2:
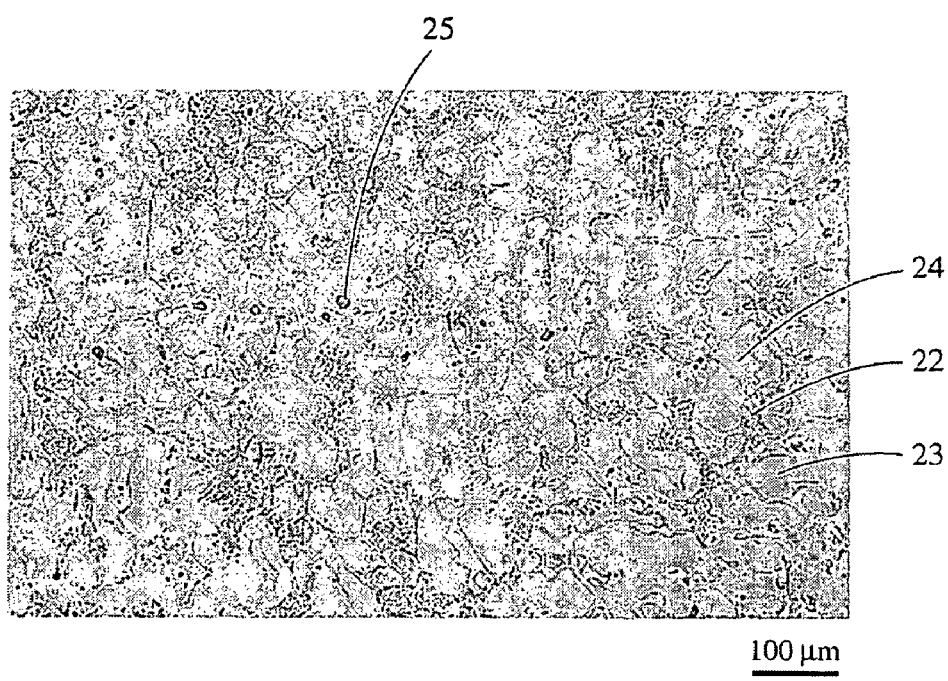
FIG. 2 is a photomicrograph (magnification: 100 times) showing the metal microstructure of Example 41.
Figure 4:
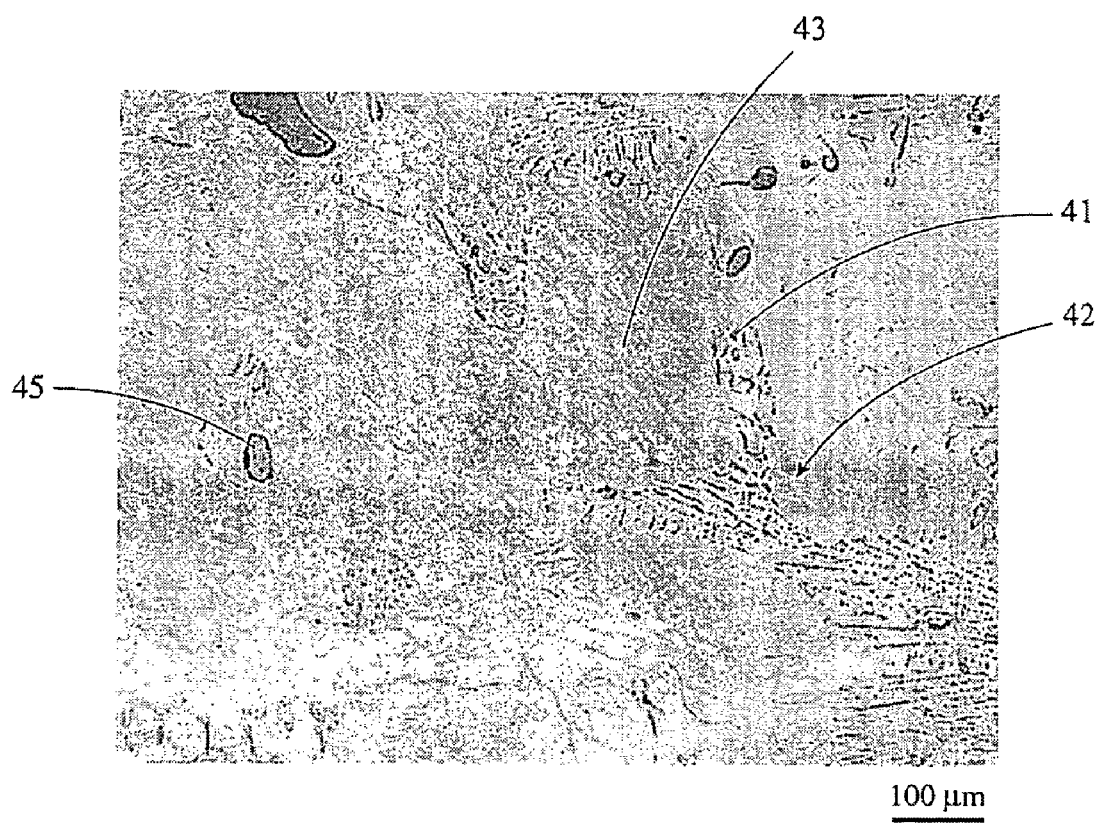
FIG. 4 is a photomicrograph (magnification: 400 times) showing the metal microstructure of Example 41.

The microstructure of the cast steel of Example 41 is shown in FIG. 2 (photomicrograph of 100 times) and FIG. 4 (photomicrograph of 400 times). It was observed that the microstructure comprised a martensite phase 23 and a δ-ferrite phase 24, which constitute a matrix phase, eutectic colonies 22, which are assemblies of fine eutectic carbides and the matrix phase 23, and non-metallic inclusions 25. Eutectic carbides 41, eutectic colonies 42, a martensite phase 43 constituting a matrix phase, and non-metallic inclusions 45 were observed in FIG. 4.

Figure 3:
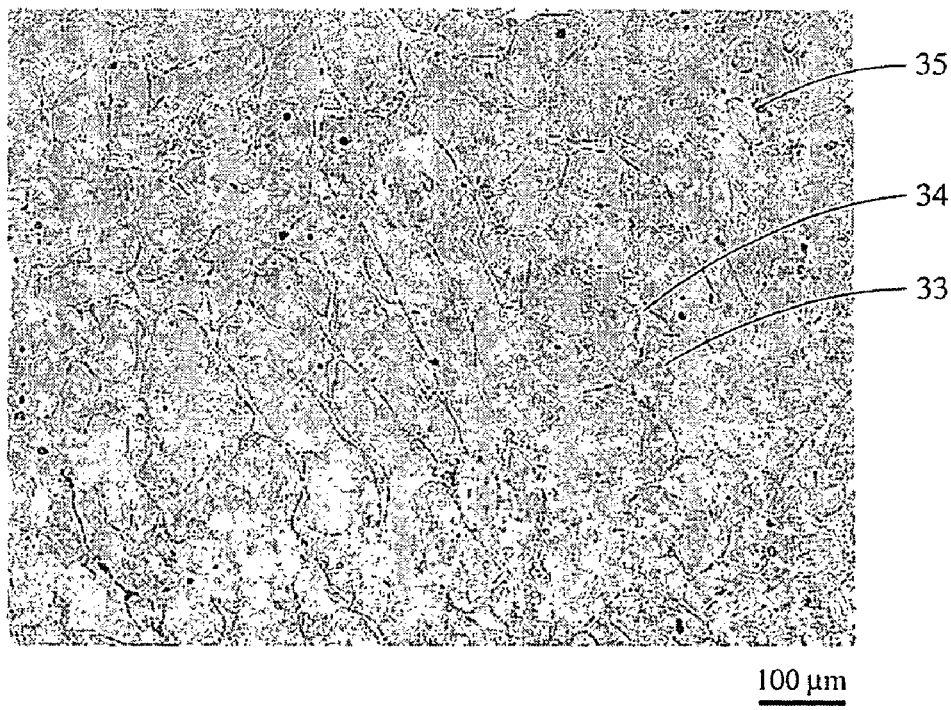
FIG. 3 is a photomicrograph (magnification: 100 times) showing the metal microstructure of Comparative Example 5.

The composition of the eutectic carbides was analyzed by a field-emission scanning electron microscope (FE-SEM EDS, available from Hitachi, Ltd. S-4000, EDX KEVEX DELTA system) with an energy-dispersive X-ray spectrometer. It was thus confirmed that the eutectic carbides were mainly composed of Nb carbides (NbC). FIG. 3 shows an optical photomicrograph (magnification: 100 times) of Comparative Example 5. A martensite phase 33 and a δ-ferrite phase 34 constituting a matrix phase, and non-metallic inclusions 35 were observed in this microstructure, but eutectic carbides were not observed.

(3) Seizure Resistance

Each sample was subjected to a reciprocal kinetic friction wear test reproducing the sliding of a piston pin on a piston, and a pin-on-disk test reproducing the sliding of a piston on a cylinder liner, to evaluate its seizure resistance.

(a) Pin Seizure Resistance

The reciprocal kinetic friction wear test was conducted in the same manner as in Examples 1-20, and the seizure resistance to a pin was evaluated by the following standards:

Excellent: The number of wear was 400 or more.
Good: The number of wear was 300 or more and less than 400.
Fair: The number of wear was 200 or more and less than 300.
Poor: The number of wear was less than 200.

(b) Liner Seizure Resistance

The pin-on-disk test was conducted in the same manner as in Examples 1-20, and the seizure resistance to a liner was evaluated by the following standards:

Excellent: The seizure load was 120 kgf or more.
Good: The seizure load was 100 kgf or more and less than 120 kgf.
Fair: The seizure load was 80 kgf or more and less than 100 kgf.
Poor: The seizure load was less than 80 kgf.

The results of the reciprocal kinetic friction wear test and the pin-on-disk test are shown in Table 6.

TABLE 6

| No.[1] | Eutectic Carbides Area Ratio (%) | Average Corresponding Circle Diameter (μm) | Number of Eutectic Colonies[2] (/mm²) | Seizure Resistance to Pin Number of Wear | Evaluation | Seizure Resistance to Liner Seizure Load (kgf) | Evaluation |
|---|---|---|---|---|---|---|---|
| Example 21 | 0.1 | 0.1 | 21 | 300 | Good | 105 | Good |
| Example 22 | 0.1 | 0.1 | 21 | 304 | Good | 110 | Good |
| Example 23 | 0.1 | 0.1 | 20 | 310 | Good | 115 | Good |
| Example 24 | 0.2 | 0.2 | 42 | 321 | Good | 110 | Good |
| Example 25 | 0.3 | 0.2 | 38 | 324 | Good | 115 | Good |
| Example 26 | 15.0 | 2.0 | 39 | 520 | Excellent | 125 | Excellent |
| Example 27 | 27.0 | 2.2 | 23 | 500 | Excellent | 133 | Excellent |
| Example 28 | 33.0 | 2.2 | 15 | 503 | Excellent | 130 | Excellent |
| Example 29 | 3.7 | 1 | 28 | 311 | Good | 110 | Good |
| Example 30 | 3.9 | 1.1 | 32 | 416 | Excellent | 125 | Excellent |
| Example 31* | 3.9 | 1.1 | 32 | 416 | Excellent | 125 | Excellent |
| Example 32 | 8.1 | 2.1 | 69 | 588 | Excellent | 133 | Excellent |
| Example 33 | 32.8 | 3.3 | 12 | 502 | Excellent | 122 | Excellent |
| Example 34 | 4.6 | 1.4 | 50 | 521 | Excellent | 130 | Excellent |
| Example 35 | 4.9 | 1.3 | 52 | 523 | Excellent | 129 | Excellent |
| Example 36 | 4.9 | 1.3 | 55 | 533 | Excellent | 131 | Excellent |
| Example 37 | 4.7 | 1.4 | 54 | 541 | Excellent | 131 | Excellent |
| Example 38 | 0.1 | 0.1 | 5 | 305 | Good | 110 | Good |
| Example 39 | 1.2 | 0.5 | 55 | 310 | Good | 115 | Good |
| Example 40 | 7.1 | 1.8 | 35 | 540 | Excellent | 125 | Excellent |
| Example 41 | 5.0 | 1.5 | 55 | 521 | Excellent | 130 | Excellent |
| Example 42 | 27 | 3 | 18 | 510 | Excellent | 120 | Excellent |
| Example 43 | 5.0 | 1.3 | 52 | 520 | Excellent | 123 | Excellent |
| Example 44 | 4.6 | 1.2 | 53 | 500 | Excellent | 120 | Excellent |
| Example 45 | 4.7 | 1.2 | 50 | 512 | Excellent | 135 | Excellent |
| Comp. Ex. 5 | 0.0 | — | — | 210 | Fair | 88 | Fair |
| Comp. Ex. 6* | 0 | — | — | 26 | Poor | 60 | Poor |
| Comp. Ex. 7 | 0 | — | — | 30 | Poor | 66 | Poor |
| Comp. Ex. 8* | 0.0 | — | — | 223 | Fair | 89 | Fair |
| Comp. Ex. 9* | 0.1 | 0.12 | 3 | 33 | Poor | 80 | Fair |
| Comp. Ex. 10* | 6 | 1.4 | 61 | 251 | Fair | 88 | Fair |
| Comp. Ex. 11 | 0.0 | — | — | 154 | Poor | 82 | Fair |
| Comp. Ex. 12* | 35.7 | 3.3 | 9.0 | 275 | Fair | 103 | Good |

Note:
[1]"Comp. Ex." means Comparative Example, and "Conv. Ex." means Conventional Example.
[2]The number of eutectic colonies each having an area of 50 μm² or more.
*No heat treatment was conducted.

As is clear from Table 6, the area ratio of eutectic carbides was less than 1% in Examples 21-25 and 38, and within the preferred range (1-35%) of the present invention in Examples 26-37, 39-45. The average equivalent-circle diameter of the eutectic carbides was within the preferred range (3 μm or less) of the present invention in any Examples other than Example 33. The number of eutectic colonies each having an area of 50 μm² or more per a unit area was within the preferred range (10 or more per 1 mm²) of the present invention in any Examples other than Example 38. On the other hand, Comparative Examples 5-12 except for Comparative Examples 9 and 10 (poor in seizure resistance and thermal cracking resistance) were outside the preferred range of the present invention.

It is clear from Table 6 that the number of wear in the reciprocal kinetic friction wear test was as many as 300 or more in Examples 21-45, exhibiting excellent seizure resistance to a pin. Also, Examples 21-45 exhibited as large a seizure load as 100 kgf or more in the pin-on-disk test, indicating that they had excellent seizure resistance to a liner. On the other hand, Comparative Examples 5-12 were poor in both seizure resistance to a pin and a liner.

Tendency was appreciated that the more the area ratio of eutectic carbides, the average equivalent-circle diameter and the number of eutectic colonies each having an area of 50 μm² or more per a unit area, the larger the seizure resistance (seizure resistance to a pin and a liner).

(4) Sulfides (a) Area ratio of sulfides and ratio of sulfides having circularity of 0.7 or more Each sample was measured with respect to the area ratio (%) of sulfides and the ratio of sulfides having a circularity of 0.7 or more in the same manner as in Examples 1-20. The results are shown in Table 7.

(5) Structure

The austenite ratio (γratio) of each sample was measured in the same manner as in Examples 1-20. The results are shown in Table 7.

(6) Room-Temperature Elongation and High-Temperature Yield Strength

Each sample was measured with respect to a room-temperature elongation (%) at 25° C., and 0.2-% yield strength (MPa) at 350° C., 450° C. and 500° C., respectively, in the same manner as in Examples 1-20. The results are shown in Table 7.

TABLE 7

| No.[1] | Area Ratio of Sulfides (%) | Percentage of Sulfides Having Circularity ≧ 0.7 (%)[2] | γ Ratio (%) | Room-Temperature Elongation (%) | 0.2-% Yield Strength (MPa) at | | |
|---|---|---|---|---|---|---|---|
| | | | | | 350° C. | 450° C. | 500° C. |
| Example 21 | 0.1 | 98 | 0.0 | 27.8 | 502 | 415 | 375 |
| Example 22 | 0.2 | 84 | 0.0 | 23.0 | 512 | 431 | 388 |
| Example 23 | 0.5 | 88 | 0.0 | 23.6 | 488 | 405 | 370 |
| Example 24 | 0.6 | 84 | 0.0 | 21.6 | 553 | 451 | 401 |
| Example 25 | 0.8 | 85 | 1.0 | 20.0 | 563 | 460 | 421 |
| Example 26 | 1.2 | 75 | 4.0 | 14.7 | 642 | 622 | 531 |
| Example 27 | 2.7 | 74 | 12.0 | 15.6 | 470 | 387 | 364 |
| Example 28 | 2.9 | 70 | 29.9 | 9.7 | 321 | 287 | 286 |
| Example 29 | 0.2 | 86 | 6.2 | 16.2 | 781 | 721 | 622 |
| Example 30 | 0.8 | 87 | 4.2 | 16.5 | 631 | 611 | 528 |
| Example 31* | 0.8 | 87 | 4.2 | 16.5 | 631 | 611 | 528 |
| Example 32 | 0.8 | 87 | 2.2 | 9.8 | 625 | 604 | 512 |
| Example 33 | 0.8 | 86 | 3.6 | 3.5 | 655 | 633 | 551 |
| Example 34 | 0.5 | 95 | 6.5 | 12.4 | 771 | 692 | 621 |
| Example 35 | 0.7 | 88 | 6.0 | 10.9 | 681 | 633 | 554 |
| Example 36 | 1.1 | 84 | 7.5 | 9.5 | 696 | 622 | 541 |
| Example 37 | 3.0 | 70 | 6.0 | 6.4 | 542 | 465 | 367 |
| Example 38 | 1 | 88.9 | 12.0 | 16.1 | 531 | 455 | 358 |
| Example 39 | 0.9 | 92.5 | 10.0 | 15.5 | 661 | 610 | 544 |
| Example 40 | 1 | 87.7 | 28.8 | 9.8 | 686 | 623 | 545 |
| Example 41 | 0.8 | 81 | 5.8 | 9.9 | 677 | 633 | 541 |
| Example 42 | 1.1 | 88 | 6.6 | 2.6 | 645 | 611 | 533 |
| Example 43 | 0.6 | 88 | 3.2 | 10.3 | 655 | 621 | 535 |
| Example 44 | 0.5 | 84 | 4.0 | 9.7 | 661 | 629 | 541 |
| Example 45 | 0.5 | 89 | 4.0 | 12.5 | 630 | 605 | 526 |
| Comp. Ex. 5 | 0.2 | 86.4 | 6.2 | 16.2 | 781 | 721 | 622 |
| Comp. Ex. 6* | 2.8 | 66.7 | 8.7 | 10.5 | 671 | 610 | 510 |
| Comp. Ex. 7 | 3.1 | 65 | 11 | 10.1 | 665 | 606 | 503 |
| Comp. Ex. 8* | 2.8 | 67 | 8.7 | 11.1 | 671 | 610 | 510 |
| Comp. Ex. 9* | 3.3 | 61.3 | 96 | 12.2 | 446 | 437 | 398 |
| Comp. Ex. 10* | 3.8 | 58.9 | 33.1 | 11.6 | 512 | 468 | 432 |
| Comp. Ex. 11 | 0.1 | 89 | 18.2 | 12.1 | 621 | 601 | 561 |
| Comp. Ex. 12* | 0.2 | 90 | 7.7 | 1.1 | 633 | 608 | 541 |

Note:
[1]"Comp. Ex." means Comparative Example, and "Conv. Ex." means Conventional Example.
[2]A ratio of the number of sulfides having a circularity of 0.7 or more to the total number of sulfides.
*No heat treatment was conducted.

As is clear from Table 7, the area ratio of sulfides was within a preferred range of 0.2-3% in all Examples except for Example 21, and the percentage of sulfides having a circularity of 0.7 or more was within a preferred range of 70% or more in all Examples. The austenite ratio was within the preferred range (less than 30%) of the present invention in all Examples. With respect to the room-temperature elongation and the high-temperature yield strength, Examples 21-45 were substantially equal to or higher than Comparative Examples 5-12.

(7) High-Temperature Rigidity

The Young's modulus (GPa) of each sample was measured in the same manner as in Examples 1-20. The results are shown in Table 8.

(8) Thermal Cracking Resistance

The maximum crack length (μm) of each sample was measured in the same manner as in Examples 1-20, and evaluated by the following standards.

Excellent: The maximum crack length was 50 μm or less.
Good: The maximum crack length was more than 50 μm and 100 μm or less.
Fair: The maximum crack length was more than 100 μm and 150 μm or less.
Poor: The maximum crack length was more than 150 μm.

The measurement results of the maximum crack length and the evaluation results of the thermal cracking resistance are shown in Table 8.

(9) Average Linear Thermal Expansion Coefficient Between Room Temperature and 500° C.

Each sample was measured with respect to an average linear thermal expansion coefficient between room temperature and 500° C. in the same manner as in Examples 1-20. The results are shown in Table 8.

TABLE 8

| No.[1] | Young's Modulus (GPa) | | | Thermal Cracking Resistance | | $\alpha^{(2)}$ ($\times 10^{-6}$/° C.) |
|---|---|---|---|---|---|---|
| | 350° C. | 450° C. | 500° C. | Maximum Crack Length (μm) | Evaluation | |
| Example 21 | 197 | 177 | 161 | 98 | Good | 12.1 |
| Example 22 | 198 | 178 | 163 | 95 | Good | 12.5 |

TABLE 8-continued

| | Young's Modulus (GPa) | | | Thermal Cracking Resistance | | |
|---|---|---|---|---|---|---|
| No.[1] | 350° C. | 450° C. | 500° C. | Maximum Crack Length (μm) | Evaluation | α[2] (×10⁻⁶/° C.) |
| Example 23 | 199 | 177 | 162 | 90 | Good | 12.2 |
| Example 24 | 197 | 177 | 155 | 78 | Good | 12.3 |
| Example 25 | 197 | 176 | 154 | 47 | Excellent | 12.3 |
| Example 26 | 196 | 177 | 156 | 44 | Excellent | 12.2 |
| Example 27 | 196 | 176 | 159 | 54 | Good | 12.1 |
| Example 28 | 197 | 172 | 159 | 87 | Good | 12.1 |
| Example 29 | 195 | 182 | 161 | 33 | Excellent | 12.1 |
| Example 30 | 197 | 184 | 151 | 62 | Good | 11.9 |
| Example 31* | 197 | 184 | 151 | 62 | Good | 11.9 |
| Example 32 | 194 | 170 | 153 | 48 | Excellent | 12.0 |
| Example 33 | 196 | 171 | 152 | 97 | Good | 12.1 |
| Example 34 | 191 | 176 | 163 | 27 | Excellent | 12.1 |
| Example 35 | 196 | 177 | 156 | 40 | Excellent | 12.1 |
| Example 36 | 190 | 178 | 155 | 42 | Excellent | 12.5 |
| Example 37 | 190 | 175 | 161 | 80 | Good | 12.4 |
| Example 38 | 190 | 177 | 156 | 31 | Excellent | 11.8 |
| Example 39 | 195 | 170 | 155 | 20 | Excellent | 11.6 |
| Example 40 | 193 | 177 | 155 | 54 | Good | 12.5 |
| Example 41 | 193 | 175 | 165 | 26 | Excellent | 12.6 |
| Example 42 | 190 | 178 | 158 | 44 | Excellent | 11.5 |
| Example 43 | 195 | 176 | 155 | 41 | Excellent | 12.2 |
| Example 44 | 192 | 176 | 156 | 42 | Excellent | 12.3 |
| Example 45 | 191 | 177 | 157 | 50 | Excellent | 12.1 |
| Comp. Ex. 5 | 195 | 182 | 161 | 35 | Excellent | 12.1 |
| Comp. Ex. 6* | 169 | 158 | 138 | 162 | Poor | 11.5 |
| Comp. Ex. 7 | 171 | 155 | 136 | 179 | Poor | 12.5 |
| Comp. Ex. 8* | 169 | 158 | 138 | 162 | Poor | 11.5 |
| Comp. Ex. 9* | 162 | 154 | 132 | 110 | Fair | 18 |
| Comp. Ex. 10* | 164 | 156 | 135 | 122 | Fair | 17.2 |
| Comp. Ex. 11 | 193 | 171 | 150 | 168 | Poor | 12.4 |
| Comp. Ex. 12* | 194 | 171 | 149 | 150 | Fair | 12.2 |

Note:
[1]"Comp. Ex." means Comparative Example, and "Conv. Ex." means Conventional Example.
[2]Average linear thermal expansion coefficient between room temperature and 500° C.
*No heat treatment was conducted.

The high-temperature rigidity was within the preferred range (140 Gpa or more) of the present invention in Examples 21-45. Any of Examples 21-45 had excellent thermal cracking resistance. On the other hand, Comparative Examples 6-12 had the maximum crack length exceeding 100 μm. Comparative Example 5 had poor seizure resistance, despite as small maximum crack length as 35 μm.

These results revealed that the martensitic cast steel meeting the requirements of the present invention had much higher seizure resistance and thermal cracking resistance than those of other materials, while holding room-temperature elongation, high-temperature yield strength and high-temperature rigidity equal to or higher than those of the other materials.

EXAMPLE 46

Using a martensitic cast steel comprising 0.24% by mass of C, 0.61% by mass of Si, 0.57% by mass of Mn, 3.87% by mass of Ni, 15.92% by mass of Cr, 2.99% by mass of Cu, 2.10% by mass of Nb, and 0.072% by mass of S, the piston 10 shown in FIG. 1 was integrally cast. This piston 10 comprised a head portion 11, a skirt portion 12, a cooling hollow portion 13, a pin boss portion 14, a pin-engaging inner surface 14d, a combustion chamber 15, a top surface 16, a lip 17, a top land 18, and ring grooves 19. 10h denotes a compression height, and D denotes an external diameter.

The properties of the above cast steel were as follows:
Area ratio of eutectic carbides: 7.7%.
Average corresponding circle diameter of eutectic carbides: 2.0 μm.
Number of eutectic colonies having an area of 50 μm² or more: 50/mm².
Pin seizure resistance (number of wear): 561.
Liner seizure resistance (seizure load): 130 kgf.
Area ratio of sulfides: 0.7%.
Ratio of sulfides having a circularity of 0.7 or more to total sulfides: 86%.
γ ratio: 6.1%.
Room-temperature elongation: 9.8%.
0.2-% yield strength
 at 350° C.: 625 MPa,
 at 450° C.: 604 MPa, and
 at 50°° C.: 512 MPa.
Young's modulus
 at 350° C.: 194 GPa,
 at 450° C.: 170 GPa, and
 at 50°° C.: 153 GPa.
Thermal cracking resistance (maximum crack length): 48 μm.
Average linear thermal expansion coefficient between room temperature and 500° C.: 12.1×10⁻⁶/° C.

The above cast steel was poured into a ladle at 1610° C., and then poured into a sand mold having a cavity having a shape of the piston shown in FIG. 1 at 1520° C. Conducted after casting was a solution treatment comprising holding the cast steel at 1040° C. for 1 hour and then rapidly cooling it, and then an aging treatment comprising holding it at 600° C. for 4 hours and then air-cooling it. The resultant piston 10 was cut and ground in its outer periphery. To reduce its weight, main portions of the piston 10 had an average thickness of 3.0 mm or less. Casting defects such as shrinkage cavities, insufficient penetration of a melt, gas defects, etc. did not occur in the casting step, neither did troubles such as poor cutting, the abnormal wear of tools, etc. occur in the machining step.

In the skirt portion 12, the pin boss portion 14 and the ring grooves 19 of the resultant piston 10, the area ratio of eutectic carbides was 3.2-12.6%, the average equivalent-circle diameter of eutectic carbides was 1.8-2.4 μm, and the number of eutectic colonies each having an area of 50 μm² or more per a unit area was 48-72/mm².

The resultant pistons 10 were assembled in a 10,000-cc, 6-cylinder diesel engine, to conduct a durability test under the conditions of a piston temperature of 452° C. and a combustion pressure of 20 MPa for 400 hours. During the durability test, no troubles such as blowby, seizure, etc. occurred. The observation of the pistons 10 after the durability test revealed that the skirt portion 12, the pin boss portion 14, etc. were free from wear, scuffing, breakage, etc., and that the lip 17 was not thermally cracked.

COMPARATIVE EXAMPLE 13

Using the cast iron of Conventional Example 1, a piston was produced in the same manner as in Example 46. Eutectic carbides were not observed in any of the skirt portion, the pin boss portion and the ring grooves of the resultant piston. This piston was subjected to the durability test under the same conditions as in Example 46. Abnormal sounds were generated after 5 hours from the start of the test, resulting in a reduced engine power. Thus, the durability test was stopped. The observation of the piston after the durability test revealed that the skirt portion had scuff, which appeared to be generated by strong impact, and that there were fine thermal cracks in the lip. These durability test results indicate that even the piston made of the cast iron of Conventional Example 1 having relatively good seizure resistance due to the self-lubrication of graphite has insufficient heat resistance, durability and seizure resistance, under severe conditions of a piston temperature of 450° C. or higher and a combustion pressure of 20 MPa or more, if its main portions have an average thickness of 3.0 mm or less.

As described above, the internal engine piston of the present invention has good room-temperature elongation, and sufficient high-temperature yield strength, high-temperature rigidity, seizure resistance and thermal cracking resistance even under severe conditions of a piston temperature of 450° C. or higher and a combustion pressure of 20 MPa or more. Such internal engine pistons are suitable for automobile engines, particularly for diesel engines.

What is claimed is:

1. An integrally cast steel piston for internal engines formed by pouring a cast steel into a sand mold having a cavity having a shape of said integrally cast steel piston, wherein said cast steel has a microstructure containing eutectic carbides forming eutectic colonies which are assemblies of eutectic carbides and a matrix phase.

2. The internal engine piston according to claim 1, whose head portion, pin boss portion and skirt portion are integrally cast.

3. The internal engine piston according to claim 2, wherein it further comprises a cooling hollow portion, which is formed by integral casting.

4. The internal engine piston according to claim 3, wherein it is a diesel engine piston comprising a combustion chamber in a head portion, and wherein it further comprises a cooling hollow portion, which is formed near said combustion chamber by integral casting.

5. An integrally cast steel piston for internal engines formed by pouring a cast steel into a sand mold having a cavity having a shape of said integrally cast steel piston, wherein said cast steel has a microstructure containing eutectic carbides forming eutectic colonies, which are assemblies of eutectic carbides and a matrix phase, said cast steel having a composition comprising, by mass, 0.8% or less of C, 3% or less of Si, 3% or less of Mn, 0.2% or less of S, 3% or less of Ni, 6% or less of Cr, 6% or less of Cu, and 0.01-3% of Nb, the balance being substantially Fe and inevitable impurities.

6. The internal engine piston according to claim 5, wherein said cast steel has a composition comprising, by mass, 0.1-0.55% of C, 0.2-2% of Si, 0.3-3% of Mn, more than 0.005% and 0.2% or less of 5, 1% or less of Ni, 3% or less of Cr, 1-4% of Cu, and 0.1-3% of Nb, the balance being substantially Fe and inevitable impurities.

7. The internal engine piston according to claim 5, wherein said cast steel further comprises 0.5% by mass or less of V and/or Ti.

8. The internal engine piston according to claim 5, wherein said cast steel further comprises at least one of Al, Mg and Ca in an amount of 0.04% by mass or less.

9. The internal engine piston according to claim 5, wherein said cast steel has a 0.2-% yield strength of 350 MPa or more and a Young's modulus of 140 GPa or more in a range of 350° C to 500° C, and an average linear thermal expansion coefficient of $10\text{-}16 \times 10^{-6}/°$ C between room temperature and 500° C.

10. An integrally cast steel piston for internal engines formed by pouring a cast steel into a sand mold having a cavity having a shape of said integrally cast steel piston, wherein said cast steel has a microstructure containing eutectic carbides forming eutectic colonies, which are assemblies of eutectic carbides and a matrix phase, said cast steel having a composition comprising, by mass, 0.1-0.8% of C, 3% or less of Si, 3% or less of Mn, 0.2% or less of S, 10% or less of Ni, 30% or less of Cr, 6% or less of Cu, and 0.05-8% of Nb, the balance being substantially Fe and inevitable impurities.

11. The internal engine piston according to claim 10, wherein said cast steel has a composition comprising, by mass, 0.1-0.55% of C, 0.2-2% of Si, 0.3-3% of Mn, 0.05-0.2% of S, 0.5-6% of Ni, 6-20% of Cr, 1-4% of Cu, and 0.2-5% of Nb, the balance being substantially Fe and inevitable impurities.

12. The internal engine piston according to claim 10, wherein said cast steel comprises C, Ni and Nb in a range of $0.05 < (C\% + 0.15\,Ni\% - 0.12\,Nb\%) \leq 0.8$ by mass.

13. The internal engine piston according to claim 10, wherein said cast steel has a matrix microstructure, less than 30% of which is an austenite phase.

14. An integrally cast steel piston for internal engines formed by pouring a cast steel into a sand mold having a cavity having a shape of said integrally cast steel piston, said cast steel having a microstructure having eutectic carbides at an area ratio of 1-35%, said eutectic carbides forming eutectic colonies, which are assemblies of eutectic carbides and a matrix phase.

15. The internal engine piston according to claim 14, wherein said eutectic carbides have an average equivalent-circle diameter of 3μm or less.

16. The internal engine piston according to claim 14, wherein the number of eutectic colonies each having an area of 50μm² or more is 10 or more in a 1-mm²-cross section of the microstructure.

17. The internal engine piston according to claim 14, wherein said eutectic carbides include Nb carbides.

18. An integrally cast steel piston for internal engines formed by pouring a cast steel into a sand mold having a cavity having a shape of said integrally cast steel piston, wherein said cast steel has a microstructure containing eutectic carbides forming eutectic colonies, which are assemblies of eutectic carbides and a matrix phase, wherein an area ratio of sulfides is 0.2-3.0% in a cast steel microstructure, and wherein a ratio of the number of sulfides each having a circularity of 0.7 or more to the total number of sulfides is 70% or more.

19. The internal engine piston according to claim 18, wherein said sulfide contains Mn and/or Cr.

20. A method for producing an integrally cast steel piston for internal engines formed by pouring a cast steel into a sand mold having a cavity having a shape of said integrally cast steel piston, wherein said cast steel has a microstructure containing eutectic carbides forming eutectic colonies, which are assemblies of eutectic carbides and a matrix phase, said cast steel having a composition comprising, by mass, 0.8% or less of C, 3% or less of Si, 3% or less of Mn, 0.2% or less of S, 3% or less of Ni, 6% or less of Cr, 6% or less of Cu, and 0.01-3% of Nb, the balance being substantially Fe and inevitable impurities, said method comprising casting said steel, holding it at 850° C or higher, and then air-cooling it.

21. A method for producing an integrally cast steel piston for internal engines formed by pouring a cast steel into a sand mold having a cavity having a shape of said integrally cast steel piston, wherein said cast steel has a microstructure containing eutectic carbides forming eutectic colonies, which are assemblies of eutectic carbides and a matrix phase, said cast steel having a composition comprising, by mass, 0.1-0.8% of C, 3% or less of Si, 3% or less of Mn, 0.2% or less of S, 10% or less of Ni, 30% or less of Cr, 6% or less of Cu, and 0.05-8% of Nb, the balance being substantially Fe and inevitable impurities, wherein said cast steel is cast, held at 450° C or higher, and then air-cooled.

22. The method for producing an internal engine piston according to claim 21, wherein said cast steel is held at 1000° C or higher after casting, rapidly cooled, held at 450° C or higher, and then air-cooled.

\* \* \* \* \*